US009956477B2

(12) United States Patent
Masuda

(10) Patent No.: US 9,956,477 B2
(45) Date of Patent: May 1, 2018

(54) INFORMATION PROCESSING APPARATUS, INFORMATION PROCESSING SYSTEM, STORAGE MEDIUM AND INFORMATION PROCESSING METHOD

(71) Applicant: Junichi Masuda, Tokyo (JP)

(72) Inventor: Junichi Masuda, Tokyo (JP)

(73) Assignees: NINTENDO CO., LTD., Kyoto (JP); GAME FREAK INC., Tokyo (JP)

( * ) Notice: Subject to any disclaimer, the term of this patent is extended or adjusted under 35 U.S.C. 154(b) by 64 days.

(21) Appl. No.: 14/206,500

(22) Filed: Mar. 12, 2014

(65) Prior Publication Data

US 2014/0364211 A1    Dec. 11, 2014

(30) Foreign Application Priority Data

Jun. 6, 2013    (JP) .................................. 2013-119711

(51) Int. Cl.
*A63F 13/00* (2014.01)
*H04L 29/08* (2006.01)
(Continued)

(52) U.S. Cl.
CPC ............ *A63F 13/00* (2013.01); *A63F 13/216* (2014.09); *A63F 13/235* (2014.09); *A63F 13/34* (2014.09);
(Continued)

(58) Field of Classification Search
CPC .......... A63F 2300/406; A63F 2300/556; A63F 13/00; A63F 13/216; A63F 13/795; H04L 67/306
See application file for complete search history.

(56) References Cited

U.S. PATENT DOCUMENTS 6,166,679 A * 12/2000 Lemelson ............... G01S 19/18
342/357.57
2006/0252548 A1    11/2006 Sasaki et al.
(Continued)

FOREIGN PATENT DOCUMENTS

EP    2 180 665    4/2010
EP    2 422 855    2/2012
(Continued)

OTHER PUBLICATIONS

Extended European Search Report (8 pages), dated Jun. 11, 2014, issued in corresponding European Application No. 14160653.3-1853.
(Continued)

*Primary Examiner* — James S McClellan
*Assistant Examiner* — Kevin Carter
(74) *Attorney, Agent, or Firm* — Nixon & Vanderhye PC

(57) ABSTRACT

A non-limiting example information processing apparatus that functions as a game apparatus includes a first LCD and a second LCD, and usually, a game screen of a single-play game is displayed on the first LCD and a list screen is displayed on the second LCD. The list screen displays at least an icon of a player of another game apparatus capable of performing a communication with the information processing apparatus. In addition, icons of a player who is registered in the game apparatus as a friend and a player who is determined as an acquaintance are also displayed whether a communication can be performed. By performing a communication with using the game apparatus with a passer-by player with whom no communication has been performed, for example, the player is automatically determined as an acquaintance player.

20 Claims, 14 Drawing Sheets

(51) Int. Cl.
H04L 29/06 (2006.01)
A63F 13/216 (2014.01)
A63F 13/34 (2014.01)
A63F 13/795 (2014.01)
A63F 13/235 (2014.01)

(52) U.S. Cl.
CPC .......... A63F 13/795 (2014.09); H04L 67/306 (2013.01); H04L 67/38 (2013.01)

(56) References Cited

U.S. PATENT DOCUMENTS

| | | | |
|---|---|---|---|
| 2007/0117576 A1* | 5/2007 | Huston | A63B 24/0021 455/461 |
| 2007/0207860 A1 | 9/2007 | Yamauchi et al. | |
| 2007/0213975 A1* | 9/2007 | Shimoda | A63F 13/12 704/9 |
| 2007/0218997 A1* | 9/2007 | Cho | 463/42 |
| 2008/0119281 A1 | 5/2008 | Hirose et al. | |
| 2008/0227552 A1 | 9/2008 | Shimomura et al. | |
| 2009/0075738 A1* | 3/2009 | Pearce | 463/42 |
| 2010/0274902 A1* | 10/2010 | Penman | A63F 13/12 709/227 |
| 2010/0287011 A1* | 11/2010 | Muchkaev | A63F 13/12 379/93.13 |
| 2011/0145381 A1* | 6/2011 | Saint-Hilaire | G06F 1/3203 709/223 |
| 2012/0011256 A1 | 1/2012 | Masuda et al. | |
| 2012/0220376 A1 | 8/2012 | Takayama et al. | |
| 2012/0322560 A1* | 12/2012 | Joo | A63F 13/73 463/42 |
| 2013/0165234 A1* | 6/2013 | Hall et al. | 463/42 |
| 2014/0344464 A1 | 11/2014 | Masuda et al. | |

FOREIGN PATENT DOCUMENTS

| | | |
|---|---|---|
| JP | 2005006766 | 1/2005 |
| JP | 2008129735 | 6/2008 |
| JP | 2008220645 | 9/2008 |
| JP | 2012011227 | 1/2012 |
| JP | 2012-034325 | 2/2012 |
| JP | 2012-178062 | 9/2012 |
| JP | 2013034826 | 2/2013 |
| JP | 5175403 | 2/2014 |

OTHER PUBLICATIONS

"How to use WiiU Friend List, Kariudo no Tsudoi", dated Dec. 11, 2012, searched on Apr. 21, 2017 URL http://hiwind01.blog130.fc2.com/blog-entry-137.html.

"Mario Cart 7" works well together with gyrosensor and 3D stereoscopy. Flying in the sky, Diving into the sea . . . review of the latest version of still evolving Mario Kart series is published, 4Gamer.net, dated May 13, 2013, searched on Apr. 21, 2017, URL https://web.archive.org/web/20130513093239/http://www.4gamer.net/games/113/G011332/20111228002/.

MH3GHD Recent Report 2, [MHF-Z]Ryoudan Inperial no, searched on Apr. 21, 2017, URL, http://imperialmhfg.blog.fc2.com/blog-entry-133.html.

Notification of Reasons for Refusal for Japanese Patent Application No. 2013-119711, dated May 10, 2017, with partial English language translation (10 pages).

* cited by examiner (A) GAME SCREEN 100 (SINGLE-PLAY)

(B) LIST SCREEN 150

FIG. 9

PLAYER DATA

| PLAYER ID |
| --- |
| NAME OF PLAYER |
| PROFILE INFORMATION |
| AVATAR INFORMATION |
| GAME SITUATION |
| ⋮ |

FIG. 10

SINGLE-PLAY PROCESSING DATA  504f

| CURRENT POSITION DATA |
| --- |
| LEVEL DATA |
| POSSESSING ITEM DATA |
| POSSESSING CHARACTER DATA |
| ⋮ |

FIG. 11

BATTLE-PLAY PROCESSING DATA 504g

| RECEPTION DATA |
| --- |
| OPPONENT DATA |
| ⋮ |

INFORMATION PROCESSING APPARATUS, INFORMATION PROCESSING SYSTEM, STORAGE MEDIUM AND INFORMATION PROCESSING METHOD

CROSS REFERENCE OF RELATED APPLICATION

The disclosure of Japanese Patent Application No. 2013-119711 filed on Jun. 6, 2013 is incorporated herein by reference.

FIELD

This application describes an information processing apparatus, information processing system, storage medium and information processing method, capable of performing a communication application with one or more other information processing apparatuses.

SUMMARY

It is a primary object of an embodiment to provide a novel information processing apparatus, information processing system, storage medium and information processing method.

Another object of the embodiment is to provide an information processing apparatus, information processing system, storage medium and information processing method, capable of increasing convenience of a communication connection.

A first embodiment is an information processing apparatus comprising a communicating unit, a displaying unit and a processing unit. The communicating unit is operable to perform a communication with one or more other information apparatuses. The displaying unit is operable to display information of the one or more other information processing apparatuses. The processing unit including at least one processor configured to: automatically determine the one or more other information processing apparatuses as a first classification according to performing a communication with the one or more other information processing apparatuses by the communicating unit, and control the displaying unit to display information of the one or more other information processing apparatuses determined as the first classification by the processing unit in a manner according to a communication situation with the one or more other information processing apparatuses.

According to the first embodiment, since the one or more other information processing apparatuses are automatically determined as the first classification according to performing a communication with the one or more other information processing apparatuses, and the information of the one or more other information processing apparatuses that are determined as the first classification is displayed in a manner according to a communication situation with the one or more other information processing apparatuses, in a case where a communication is to be performed with the one or more other information processing apparatuses after determination of the classification, it is possible to send an offer of communication while grasping the communication situation thereof. Furthermore, in a case where a user wishes to perform a communication again with the information processing apparatus with which a communication has been performed in the past, the user may merely search the information processing apparatus of the first classification, and accordingly, it is possible to increase convenience of communication. That is, it is possible to diversify a communication while eliminating a troublesome operation.

A second embodiment is an information processing apparatus according to the first embodiment, wherein said processing unit is configured to further register the one or more other information processing apparatuses as a second classification that is different from the first classification through mutual authentication with the one or more other information processing apparatuses.

According to the second embodiment, by making mutual authentication with the one or more other information processing apparatuses, it is possible to register the one or more other information processing apparatuses as the second classification that is different from the first classification.

A third embodiment is an information processing apparatus according to the second embodiment, wherein the processing unit is configured to register the one or more other information processing apparatuses as the second classification though mutual authentication with the one or more other information processing apparatuses that are determined as the first classification by the processing unit.

According to the third embodiment, since the one or more other information processing apparatuses are registered as the second classification though mutual authentication after the one or more other information processing apparatuses are determined as the first classification, it is possible to register the one or more other information processing apparatuses as the second classification after increasing a degree of closeness and reliability by performing a communication with the one or more other information processing apparatuses at least once. Therefore, even if the users of the information processing apparatuses are not present near to each other, but only a communication can be performed with each other, it is possible to register each of their information processing apparatuses as the second classification.

A fourth embodiment is an information processing apparatus according to the second embodiment, wherein the one or more other information processing apparatus of the first classification and the one or more other information processing apparatus of the second classification are different from each other in at least a part of available functions when a communication is performed with using the communicating unit.

According to the fourth embodiment, since a part of available function differs dependent on the classification in a case where a communication is performed with the one or more other information processing apparatuses, it is possible to determine whether the one or more information processing apparatuses are to be registered as the second classification dependent on whether such different function is to be used, for example.

A fifth embodiment is an information processing apparatus according to the second embodiment, wherein the displaying unit displays the information of the one or more other information processing apparatuses in a manner that the first classification and the second classification can be identified from each other. The information of the one or more other information processing apparatuses is displayed in a manner that the first classification and the second classification can be identified from each other by separating displaying regions or by changing a displaying manner, for example.

According to the fifth embodiment, it is possible easily to discern the first classification or the second classification.

A sixth embodiment is an information processing apparatus according to the second embodiment, wherein the processing unit is configured to further notify the information of the one or more other information processing apparatuses in a manner that the one or more other information processing apparatuses can be identified at least in terms of being classified to the first classification or the second classification when a communication request from the one or more other information processing apparatuses is received by the communicating unit. Distinction of the first or second classification or any other classification is shown by text information, for example.

According to the sixth embodiment, the classification of the other one or more information processing apparatuses being a transmission source of the communication request can be easily discerned.

A seventh embodiment is an information processing apparatus according to the first embodiment, wherein the communicating unit performs a communication based on a mutual agreement between a user of his/her own information processing apparatus and a user of the one or more other information processing apparatuses.

According to the seventh embodiment, it is possible to determine the one or more other information processing apparatuses that one or more other users own or use as the first classification according to performing a communication based on a mutual agreement between users.

An eighth embodiment is an information processing apparatus according to the first embodiment, wherein the one or more other information processing apparatuses are unspecified one or more other information processing apparatuses that are searched with using the communicating unit.

According to the eighth embodiment, since the unspecified one or more other information processing apparatuses are searched, by performing a communication with an information processing apparatus owned or used by an unknown user, for example, it is possible to determine the information processing apparatus as the first classification. Accordingly, if wishing to perform a communication again with the same user later, by searching the one or more other information processing apparatuses of the first classification, the communication can be easily performed.

A ninth embodiment is an information processing apparatus according to the eighth embodiment, wherein the communicating unit searches the unspecified one or more other information processing apparatuses through a short-distance wireless communication.

According to the ninth embodiment, by performing a communication with the one or more other information processing apparatuses owned by the user who is within range, it is possible to determine the one or more information processing apparatuses as the first classification.

A tenth embodiment is an information processing apparatus according to the eighth embodiment, wherein the communicating unit searches the unspecified one or more other information processing apparatuses through an internet communication.

According to the tenth embodiment, even if the user is not within range, by performing a communication with the one or more other information processing apparatuses owned by the users, it is possible to determine the one or more information processing apparatuses as the first classification.

An eleventh embodiment is an information processing apparatus according to the seventh embodiment, wherein the communicating unit repeatedly searches the unspecified one or more other information processing apparatuses, wherein the processing unit is configured to further update the communication situation with the one or more other information processing apparatuses in accordance with a search result by the communicating unit.

According to the eleventh embodiment, since the communication situation with the one or more other information processing apparatuses is updated in accordance with the search result by the communicating unit, it is possible to change the displaying manner of the information of the one or more other information processing apparatuses of the first classification and the second classification based on the updated communication situation, which allows the latest communication situation to be recognized.

A twelfth embodiment is an information processing system, comprising: a communicating unit operable to perform a communication with one or more information apparatuses; a displaying unit operable to display information of the one or more information processing apparatuses; and a first classification determining unit operable to automatically determine the one or more information processing apparatuses as a first classification according to performing a communication with the one or more information processing apparatuses by the communicating unit, wherein the displaying unit displays information of the one or more information processing apparatuses determined as the first classification by the first classification determining unit in a manner according to a communication situation with the one or more information processing apparatuses.

A thirteenth embodiment is a non-transitory storage medium storing an information processing program executable by a computer of an information processing apparatus having a communicating unit operable to perform a communication with one or more other information apparatuses, the information processing program causes the computer to: display information of the one or more other information processing apparatuses on a display device; and automatically determine the one or more other information processing apparatuses as a first classification according to performing a communication with the one or more other information processing apparatuses by the communicating unit, wherein information of the one or more other information processing apparatuses determined as the first classification are displayed on the display device in a manner according to a communication situation with the one or more other information processing apparatuses.

A fourteenth embodiment is an information processing method by a computer having a communicating unit operable to perform a communication with one or more information apparatuses, the computer performing steps of: (a) automatically determining the one or more information processing apparatuses as a first classification according to performing a communication with the one or more information processing apparatuses by the communicating unit, and (b) displaying information of the one or more information processing apparatuses determined as the first classification in the step (a) on a display device in a manner according to a communication situation with the one or more information processing apparatuses.

According to the twelfth to fourteenth embodiments, as similar to the first embodiment, communication is made diversified.

The above described objects and other objects, features, aspects and advantages of the embodiments will become more apparent from the following detailed description when taken in conjunction with the accompanying drawings.

BRIEF DESCRIPTION OF THE DRAWINGS

FIG. 9 is a view showing a non-limiting example specific content of player data.

FIG. 10 is a view showing a non-limiting example specific content of single-play processing data.

FIG. 11 is a view showing a non-limiting example specific content of battle-play processing data.

DETAILED DESCRIPTION OF NON-LIMITING EXAMPLE EMBODIMENTS

Figure 1:
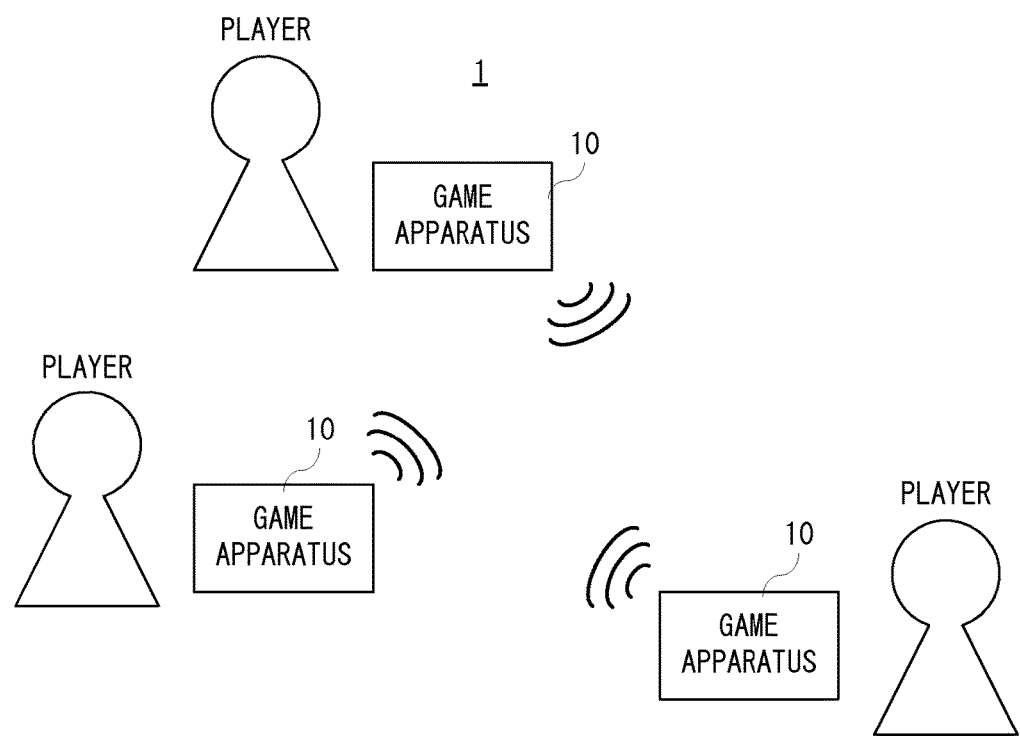
FIG. 1 is a view of a non-limiting example communication game system according to an embodiment.

With referring to FIG. 1, a communication game system 1 according to this embodiment includes a game apparatus 10 that is an example of an information processing apparatus. As seen from FIG. 1, the communication game system 1 is constructed by a plurality of game apparatuses 10. The game apparatus 10 can perform a communication with another game apparatus 10 by a short-distance wireless communication.

Each of the plurality of game apparatuses 10 shown in FIG. 1 is held by each different user or player (hereinafter, simply called as "player"). That is, the game apparatus 10 is a mobile (portable) game apparatus. Although three game apparatuses 10 are shown in the communication game system 1 shown in FIG. 1, if two or more, the number of the game apparatuses may be four or more. These are true for a communication game system 3 shown in FIG. 2.

Figure 2:
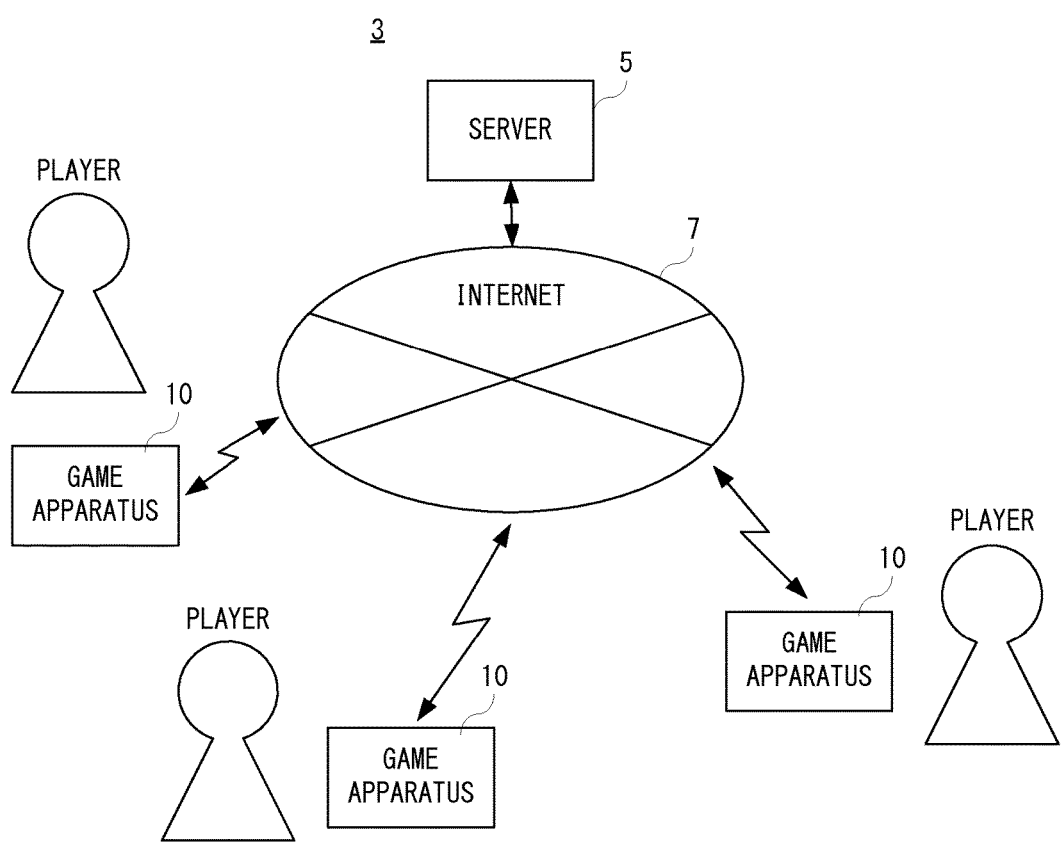
FIG. 2 is a view of a non-limiting further example communication game system according to an embodiment.

As shown in FIG. 2, a communication game system 3 of another example includes a server 5, and a plurality of game apparatuses 10 are connected to the server 5 via a network such as an internet 7 in a communication-capable manner. That is, the game apparatus 10 can be connected to a wireless LAN by wirelessly performing a data communication, and can perform a communication with the server 5 and another game apparatus 10 via an access point (not shown) and the internet 7.

Figure 3:
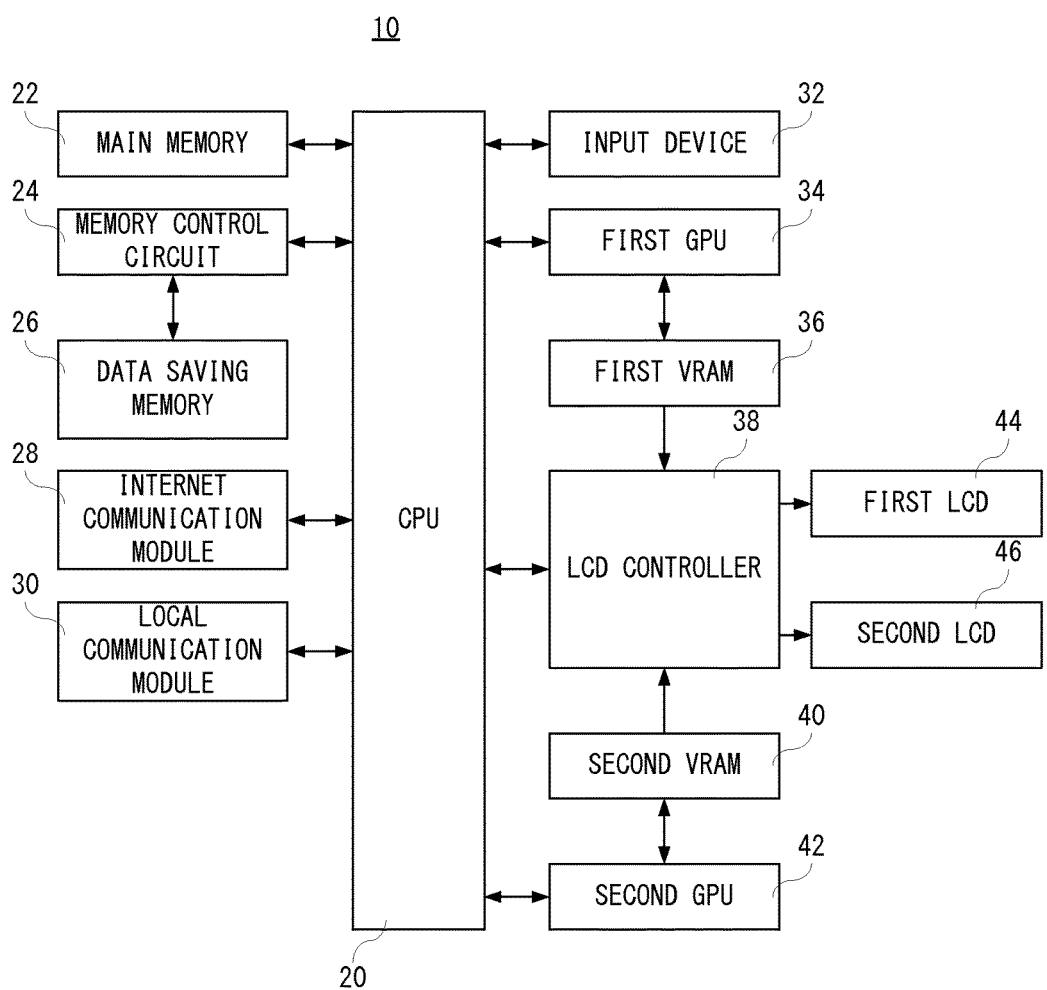
FIG. 3 is a block diagram showing a non-limiting example electric configuration of a game apparatus shown in FIG. 1 and FIG. 2.

FIG. 3 is a block diagram showing an example of electrical structure of the game apparatus 10 shown in FIG. 1 and FIG. 2. As shown in FIG. 3, the game apparatus 10 includes a CPU 20 which is connected with a main memory 22, a memory control circuit 24, an internet communication module 28, a local communication module 30, an input device 32, a first GPU (Graphics Processing Unit) 34, an LCD controller 38 and a second GPU 42. In addition, the memory control circuit 24 is connected with a data saving memory 26. Furthermore, a first VRAM (Video RAM) 36 is connected between the first GPU 34 and the LCD controller 38, and a second VRAM 40 is connected between the second GPU 42 and the LCD controller 38. Furthermore, a first LCD 44 and a second LCD 46 are connected to the LCD controller 38.

The CPU 20 is a processor or an information processing means for executing a predetermined program (application program). In this embodiment, the predetermined program is stored in a memory, (the data saving memory 26, for example) within the game apparatus 10 or an external memory, and the CPU 20 performs information processing (entire game processing) described later by executing the predetermined program.

In addition, the program to be executed by the CPU 20 may be stored in a memory in advance, or may be acquired from a memory card that is attachable to the game apparatus 10, or may be acquired (downloaded) from other equipment by performing communication with the other equipment. Furthermore, an information storage medium that stores the predetermined program may be not only a non-volatile storage medium such as the data saving memory 26 but also an optical disc storage medium such as a CD-ROM, DVD or the like.

The main memory 22 is storage or storing means that is utilized as a working area and a buffer area of the CPU 20. That is, the main memory 22 stores (temporarily stores) various kinds of data utilized for the above-described information processing, or stores programs acquired from an external (memory card or other equipment). In this embodiment, as the main memory 22, a PSRAM (Pseudo-SRAM), for example, is utilized.

The data saving memory 26 is a storage or storing means for storing (saving) data or the like such as programs to be executed by the CPU 20 and game data. The data saving memory 26 is constructed by a non-volatile storage medium, and a NAND-type flash memory may be utilized. The memory control circuit 24 controls reading data from or writing data to the data saving memory 26 in accordance with instructions by the CPU 20.

The internet communication module 28 has a function that connects to a wireless LAN according to a system conforming to a standard of IEEE 802.11.b/g, for example. Therefore, as described above, the CPU 20 sends/receives data to or from other equipment (a computer, other game apparatuses, etc.) via an access point and an internet by using the internet communication module 28.

The local communication module 30 has a function that performs a short-distance wireless communication. More specifically, the local communication module 30 has a function that performs sending/receiving of an infrared ray signal with other equipment (other game apparatuses or the like) by a predetermined communication system (an infrared ray system, for example), and a function that performs a wireless communication with the same kind of game apparatuses in accordance with a predetermined communication protocol (a multilink protocol, for example). Therefore, the CPU 20 can directly sends/receives data to or from other same kinds of game apparatuses by using the local communication module 30, for example.

The input device 32 includes various operating portions such as a push button, a cross button, an analog stick, a touch panel and so on. Operation data that indicates an inputting situation (whether or not depressed) against each button and touch position data of a predetermined format based on a signal from the touch panel are output from the input device 32. The CPU 20 acquires the operation data and the touch position data from the input device 32, and performs processing according to acquired operation data and touch position data. Although a detailed description is omitted here, in this embodiment, the touch panel is provided on the second LCD 46.

The first GPU 34 produces, according to instructions from the CPU 20, a first displaying image based on data (data for producing a displaying image) that is stored in the main memory 22, and renders the same in the first VRAM 36. The second GPU 42 similarly produces a second displaying image according to instructions from the CPU 20 and renders the same in the second VRAM 40.

The LCD controller 38 outputs the first displaying image that is rendered in the first VRAM 36 to the first LCD 44, and the second displaying image that is rendered in the second VRAM 40 to the second LCD 46.

In addition, in this embodiment, the LCD is utilized as a display device, but instead of the LCD, an EL (Electronic Luminescence) display or a plasma display may be utilized. Furthermore, the game apparatus 10 can utilize a display device having any resolution. Furthermore, the LCD controller 38 may output the first displaying image to the second LCD 46 and the second displaying image to the first LCD 44.

Furthermore, although not shown, there is also provided with a speaker for outputting a sound (music) necessary for a game.

In such a game apparatus 10, when a player starts a game (application) of this embodiment, for example, usually, game processing of a single-play is started (performed). In addition, a single-play mode means a mode that a personal game is played by a player of the game apparatus 10 alone by operating a single player character existing in a virtual game world.

Furthermore, in the game processing of the single-play mode, a player who plays the same game is searched as a candidate of a battle opponent, and it is possible to send an offer of a battle-play to a candidate of a battle opponent that is searched or to be sent an offer of a battle-play from a candidate of a battle opponent. If a mutual agreement is reached on the battle-play by receiving an acceptance of the offer of the battle-play from the candidate of the battle opponent or by accepting the offer of the battle-play from the candidate of the battle opponent, it is determined that a battle-play is to be performed. Then, the connection is established among the plurality of the game apparatuses 10 being determined to perform a battle-play, and the game processing of a battle-play mode is performed. In addition, the battle-play mode means a mode that a game for a plurality of persons is processed by operating respective player characters existing in a virtual game world by players of the plurality of game apparatuses 10 to play a game session (battle-game).

Figure 4:
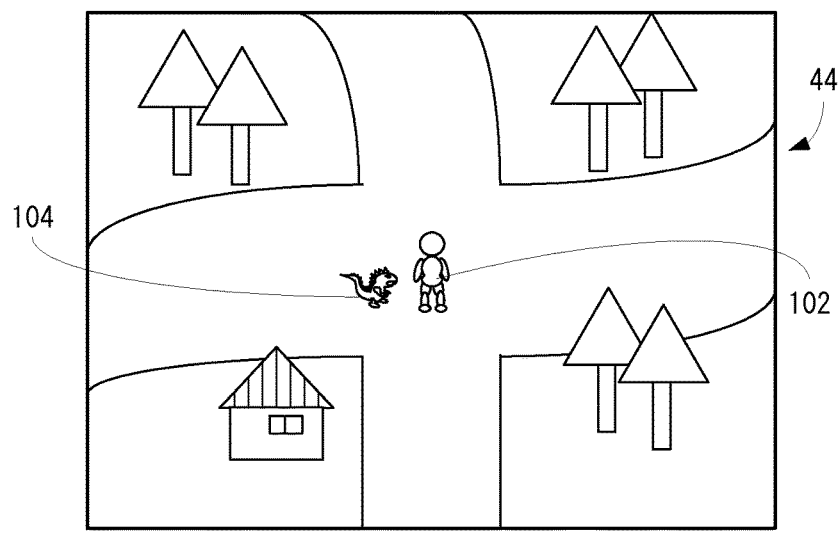
FIG. 4 is a view showing a non-limiting example game screen of a single-play displayed on a first LCD and a non-limiting example list screen displayed on a second LCD shown in FIG. 3.
Figure 4:
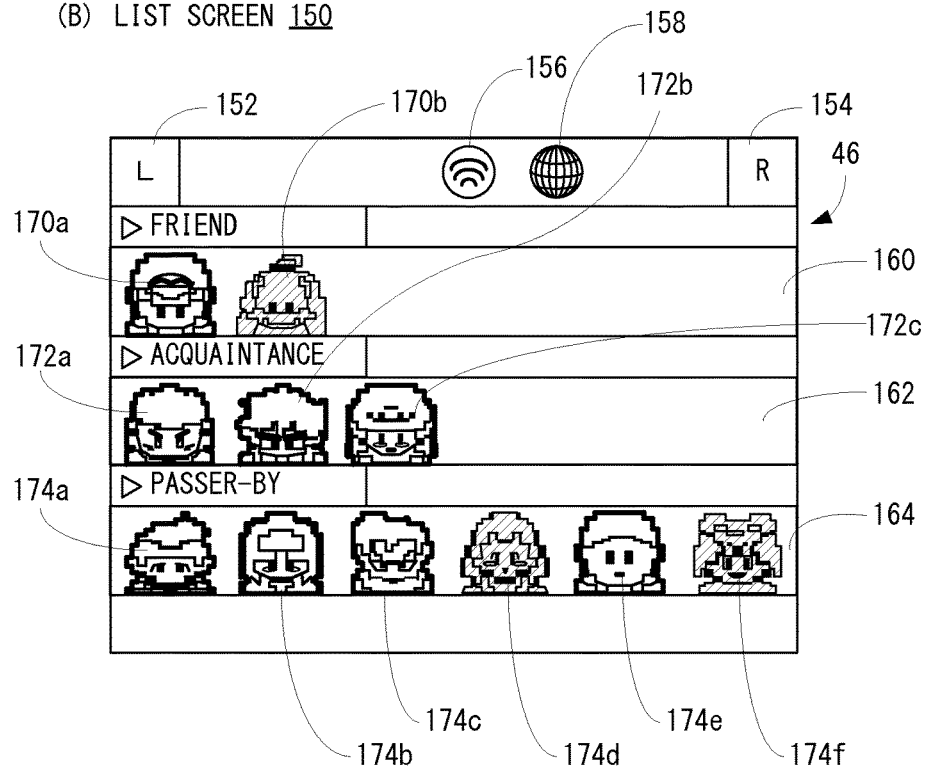

In this embodiment, by performing the game processing of the single-play mode, a game screen (application performing screen) 100 as shown in FIG. 4(A) is displayed on the first LCD 44. In the game screen 100, an image of a game world is displayed as a background, and on the image of the game world, a player character 102 and a monster character 104 that is possessed by the player character 102 are displayed.

In the single-play mode, the player character 102 moves in the game world constructed in a virtual space, or catches a wild monster character existing in the game world, or makes the monster character 104 that is caught (possessed) fight with a monster character that a non-player character (not shown) possesses or a wild monster character, in accordance with an operation of the player. The player character 102 gets a predetermined item (not shown) and uses the same according to an operation by the player.

Furthermore, in the single-play mode, as shown in FIG. 4(B), a list screen 150 for performing a selection of a battle opponent in a case where the game processing of the battle-play mode is to be performed is displayed on the second LCD 46. The candidates of the battle opponent are displayed in the list screen 150. In addition, the list screen 150 is not needed to be always displayed during a time that the game processing of the single-play mode is being performed, and the player may select displaying/non-displaying. Furthermore, in a state that it is impossible to perform the battle-play with a player of another game apparatus 10, the list screen 150 is not displayed. The state that the battle-play cannot be performed means a state that a communication cannot be performed, a state that it is impossible to send an offer of the battle-play in view of circumstances in the game processing of the single-play mode, or the like, for example. That is, the list screen 150 is displayed when it is possible to send an offer of the battle-play to a player of another game apparatus 10.

In the list screen 150 shown in FIG. 4(B), a button image 152 is displayed in an upper left portion, and a button image 154 is displayed in an upper right portion. Icons 156 and 158 are displayed between the button image 152 and the button image 154. In addition, below the button image 152 and the button image 154 and the icons 156 and 158, displaying regions 160, 162 and 164 are formed. In the displaying region 160, icons 170*a* and 170*b* applied with face images of game avatars that are used by players who are registered as friends are displayed. Furthermore, in the displaying region 162, icons 172*a*, 172*b* and 172*c* applied with face images of game avatars that are used by players who are determined as acquaintances are displayed. In the displaying region 164, icons 174*a*, 174*b*, 174*c*, 174*d*, 174*e* and 174*f* each applied with a face image of a game avatar that is used by a player who is determined as a passer-by are displayed.

Therefore, in a case that the list screen 150 as shown in FIG. 4(B) is displayed, it is possible to select any one of a friend player, an acquaintance player and a passer-by player as a battle opponent.

Furthermore, as shown in FIG. 4(B), since the icons to which the face images of the game avatars that are used by the friend player, the acquaintance player and the passer-by are applied are displayed in the list screen 150 by separating into the friend, the acquaintance and the passer-by, it is possible for the player who watches the list screen 150 to recognize such classification.

Here, a friend player means another player who is allowed (registered) to communicate with each other or in a one-way manner even in a period other than a time that the game is played.

Information (player data) for the player who is registered as a friend player is stored in the data saving memory 26 of the game apparatus 10, for example. Thus, since the player data for the player who is registered as a friend is stored in the data saving memory 26 of the game apparatus 10, it is not necessary to prepare a server and/or an external memory for storing the player data, and accordingly, it is possible to reduce a time and effort and a cost (for setting and managing).

Here, an example of a registering method of a friend player is briefly described, but, a registering method described here is a method for registering a friend player in a function that is provided in advance with the game apparatus 10 (an original function of the apparatus).

In a case where one or more players being within range are to be registered as a friend player, for example, the player searches unspecified one or more other game apparatuses 10 with using his/her own game apparatus 10 through a short-distance wireless communication using the local communication module 30, and selects a desired player out of players of one or more other game apparatuses 10 that are searched. Then, it is notified to the other game apparatus 10 that information about a selected player ("player information" described later) is stored (registered) in the data saving memory 26 of the game apparatus 10. When the processing is performed in each other's game apparatuses 10 owned by the players, in each of their game apparatuses 10, the player information for the player of the other game apparatus 10 is stored in the data saving memory 26.

Furthermore, in a case where one or more players who are not within range are to be registered as a friend player, for example, one of the players registers the player information of the other player with using the game apparatus 10 owned by the one of the players (called as "game apparatus A" for the sake of convenience).

At this time, in a case where the player information for the player of the game apparatus A is not registered in the game apparatus 10 owned by the other of the players (called as "game apparatus B" for the sake of convenience), in the game apparatus A, the player information of the player of the game apparatus B is provisionally registered (provisional registration). Then, the game apparatus A notifies to the game apparatus B that the player information for the player of the game apparatus B is provisionally registered by connecting an internet by a wireless LAN. Thereafter, in the game apparatus A, the player information for the player of the game apparatus B is actually registered (regular registration) when the game apparatus A receives a notification from the game apparatus B that the player information for the player of the game apparatus A is registered.

On the other hand, in a case where the player information for the player of the game apparatus A has been registered in the game apparatus B and this is notified to the game apparatus A when the player information for the player of the game apparatus B is registered in the game apparatus A, the player information for the player of the game apparatus B is regularly registered in the game apparatus A without any operation or processing.

In addition, a friend player registration is not based on a mutual agreement by both of the players, but may be unilaterally registered based on an intention of one of the players.

Furthermore, an acquaintance player means another player who is not registered as a friend player but has performed at least one time the battle-play in the past with the player. Furthermore, by performing a communication with one or more other game apparatuses 10 by using the game apparatus 10, each player can exchange (send/receive) a monster character 104 possessed by the player character 102 in the game world with a players who own the one or more other game apparatuses 10, and one or more other players who have performed the exchange of the monster character 104 at least one time in the past are also determined an acquaintance player.

Player data for the player who is determined as an acquaintance player is stored in the data saving memory 26 of the game apparatus 10 as save data together with game data of the battle-play, for example. Although not shown, the save data may be stored in a memory card (SD card, for example) attachable to/detachable from the game apparatus 10.

Furthermore, a passer-by player is a player who is not registered as a friend player and is not determined as an acquaintance player, and a player who owns another game apparatus 10 that is determined that the other game apparatus 10 becomes in a state capable of communicating with the game apparatus 10 at least temporarily in the single-play mode. More specifically, the passer-by player means a player having another game apparatus 10 that sends an information notifying signal (described later) that is received by the game apparatus 10 in the single-play mode. As described above, it is possible to play a battle-game or exchange game data with the passer-by player based on a mutual agreement in a case where the game according to this embodiment is performed. However, it is possible to exchange data of a single character at a time.

The player data for the player who is determined as the passer-by player is erased at a time that the game is terminated, for example. However, as described later, even during the game play, in a case where the number of the passer-by players exceeds a predetermined number, the player data is sequentially over-written (erased) from the player data of the oldest passer-by player.

In this embodiment, functions available between the game apparatus 10 and the game apparatus 10 that is registered as a friend player, the game apparatus 10 that is determined as an acquaintance player, or the game apparatus 10 that is determined as a passer-by player are different from each other. On the assumption that a degree of closeness or reliability increases in an order of a passer-by, an acquaintance and a friend, for example, as a degree of closeness or reliability increases, the availability of a certain function is made higher or a function not provided for the others becomes usable.

Specifically, as a common function, it is possible for the game apparatus 10 to transmit/receive (exchange) a character (character data) with the game apparatus 10 of any one of a friend player, an acquaintance player and a passer-by player.

For example, with the game apparatus 10 of a passer-by player, during the play of the game of this embodiment, the game apparatus 10 can transmit/receive (exchange) a character at a time; however, with the game apparatus 10 of an acquaintance player, the game apparatus 10 can transmit/receive (exchange) a plurality of characters at a time, for example.

Furthermore, with the game apparatus 10 of an acquaintance player, after performing the battle-play, it is possible to select whether the acquaintance player is to be registered as a friend player; however, it is impossible to transmit/receive game data or a message out of the game (application) of this embodiment.

With the game apparatus 10 of a friend player, even in a case where an application other than the game (application) of this embodiment is performed, that is, irrespective of a kind of an application, it is possible to exchange (transmit/receive) game data or transmit/receive a message. That is, the player information (player data) for a friend player is available irrespective of a kind of an application.

Furthermore, in this embodiment, the friend players, the acquaintance players and the passer-by players can be respectively displayed by a predetermined number (100 (a hundred), for example) in the list screen 150. In a case where the number of the players exceeds the predetermined number, the information (player data) for the player who is registered as a friend player at the earliest time or determined as an acquaintance player or a passer-by player at the earliest time, that is, the oldest player will firstly be overwritten. Although not shown, the displaying regions 160, 162 and 164 display portions of columns that the icons (170*a*, 170*b*, 172*a*-172*c*, 174*a*-174*f*, for example) that are applied with face images of game avatars used by the friend player, the acquaintance player and the passer-by player are displayed (depicted).

In this embodiment, the icons to which face images of the game avatars used by the friend player, the acquaintance player and the passer-by player are applied are displayed in the list screen 150. Therefore, it is possible to say that the list screen 150 displays the information about the friend player, the acquaintance player and the passer-by player. However, since the information of the face image of the game avatar (included in "avatar information" described later) is included in the player information that is registered (stored) in the game apparatus 10, it is also possible to say that the list screen 150 displays the information of the game apparatuses 10 owned or used by the friend player, the acquaintance player and the passer-by player.

The above-described button images 152 and 154 indicate operating buttons for scrolling the list screen 150. By depressing an L button or an R button included in the input device 32, the list screen 150 is scrolled toward left or right. In addition, by performing a slide operation on the touch panel, the list screen 150 can be also scrolled. By scrolling the list screen 150, it is possible to display an icon that is not currently displayed.

The icon 156 and the icon 158 are provided for selecting a communication method (communication unit or means). In this embodiment, in a case where an icon 156 is turned-on (touched), a short-distance wireless communication using the local communication module 30 (hereinafter, may be called as "local communication") is selected. On the other hand, if the icon 158 is turned-on, a wireless communication using the internet communication module 28 (hereinafter, may be called as "internet communication") is selected.

Although a detailed description will be omitted here, as a default setting, the local communication is selected. Furthermore, even in a case where the internet communication is selected, if it is impossible to connect the internet 7 or if the connection to the internet 7 is shut-down, the communication is automatically switched to the local communication.

During a performance of the game of the single-play mode or a battle-play mode, each game apparatus 10 transmits a status notifying signal to one or more other game apparatus 10 or to the server 5. Furthermore, each game apparatus 10 receives a status notifying signal that is transmitted from another game apparatus 10 or receives data for a game situation for another game apparatus 10 that is transmitted from the server 5. In the following, a description will be made more specifically.

In a case where the local communication is selected, each game apparatus 10 repeatedly transmits (broadcasts) a status notifying beacon signal to unspecified one or more other game apparatuses 10 with using the local communication module 30 during a performance of the game of the single-play mode or the battle-play mode. In addition, each game apparatus 10 repeatedly receives a status notifying beacon signal that is sent from unspecified one or more other game apparatuses 10 with using the local communication module 30.

A system for sending the beacon signal may be an active scan system or may be a passive scan system. More specifically, each game apparatus 10 may send (broadcast) a beacon signal with a predetermined cycle without specifying a designation, or each game apparatus 10 may send a probe request packet at a predetermined cycle without specifying a designation, and a beacon signal (probe response) may be sent from one or more other game apparatuses 10 that receive a probe request packet. In addition, a beacon signal that is sent/received in this embodiment is a short-distance wireless signal. The short-distance wireless signal is an infrared ray signal or a radio wave signal by Bluetooth (registered trademark), for example.

Here, a situation notifying beacon signal includes a kind ID, a device ID, a game ID, player information, a game situation, etc.

The kind ID is identification information for identifying a kind of the beacon signal. In this embodiment, there are three kinds of beacon signals described later in addition to an information notifying beacon signal. Such a kind is identified according to the kind ID. The device ID is identification information for identifying the game apparatus 10. The game ID is identification information for identifying a kind of a game.

The player information includes a player ID, a name of player, profile information of the player, avatar information, etc. The player ID is identification information of an owner (player) of the game apparatus 10, and indicates a transmission source of the beacon signal including the player ID. The name of player is a name that is registered in the game apparatus 10 by the player. The profile information is information of a profile (distinction of sex, place of residence, hobby, etc.) of a player him/herself that is registered by the player in the game apparatus 10. The avatar information is setting information (parameter) as to parts of a face (including hair), parts of a body, costume (a cap or hat, glasses, accessories, etc. are included) of a game avatar that is used by the player.

The game situation is information indicating whether the game processing that is being performed is a single-play mode or a battle-play mode.

In addition, in a case where the internet communication is selected, the game apparatus 10 that is performing the game of this embodiment transmits status notifying data to the server 5. The server 5 manages the game situation and communication situation (hereinafter, these may be called as "a current situation") of each game apparatus 10.

Here, the communication situation is information showing whether it is possible to perform a communication with the game apparatus 10. In this embodiment, it is possible to perform a communication with the game apparatus 10 of the single-play mode, but impossible to perform a communication with the game apparatus 10 of the battle-play mode. In addition, as a case that it is impossible to perform a communication, there are cases that the game apparatus 10 is in an off-line state, or that it is impossible to access an access point for the internet communication (it is impossible to connect the internet 7).

In addition, in a case where the local communication is selected, the game apparatus 10 cannot perform a communication in a case where the game apparatus 10 is in an off-line state or a case where the game apparatus 10 does not exist within a range that the beacon signal reaches.

In a case where the internet communication is selected, each game apparatus 10 transmits the status notifying data to the server 5 at a time that the game situation changes. Here, a time that the game situation changes means a time that a game mode is changed from the single-play mode to the battle-play mode or from the battle-play mode to the single-play mode. In addition, the status notifying data is the same or similar to the content of the above-described status notifying beacon signal, but the kind ID shows a kind of data that is transmitted to the server 5 from the game apparatus 10. Furthermore, in a case where the internet communication is selected, the game apparatus 10 notifies to, when the game is started, the server 5 that the game is started, or notifies to, when the game is ended, the server 5 that the game is ended, whereby the server 5 can know that the game apparatus 10 becomes in an on-line state or an off-line state.

On the other hand, the server 5 notifies the current situation of each of one or more other game apparatuses 10 connected to the server 5 to each of the game apparatuses 10 connected to the server 5. Although a detailed description is omitted here, the server 5 manages the player and the current situation of the player of the game apparatus 10 for each kind of the game. At this time, the server 5 determines, based on the game ID included in the status notifying data, the game apparatus 10 that is performing the same kind of game. Then, to each game apparatus 10, the current situation of one or more other game apparatuses 10 performing the same kind of game is notified. In addition, the player information of the one or more other game apparatuses 10 is added to the current situation of the one or more other game apparatuses 10.

Here, a method for updating (producing) the list screen 150 is described. In a case where the local communication is selected, if the status notifying beacon signal from one or more other game apparatuses 10 is received, for example, the game apparatus 10 determines whether the game ID included in the status notifying beacon signal is coincident with the game ID of the game of this embodiment. In a case of inconsistency of the game ID, the status notifying beacon signal that is received is erased (removed).

In a case of consistency of the game ID, it is determined whether a player indicated by the player ID is a player who is registered as a friend, or who is determined as an acquaintance. In a case where the player indicated by the player ID is registered as a friend or determined as an acquaintance, a displaying manner of an icon is changed in accordance with the game situation. In a case where the game situation indicates a single-play mode, the icon is displayed with a normal color and brightness, and in a case where the game situation is a battle-play mode, the icon is displayed in a gray out manner because the battle-play is being performed at the present and thus another battle-play cannot be played. In FIG. 4(B), by applying slant lines onto the face image, it is indicated that the icon is displayed in a gray out manner; however, any displaying manner of the icon will be possible as long as the display manner if different from a normal one, and accordingly, a color, shape or size of the icon or two or more thereof may be changed. Furthermore, the icon may be non-displayed.

In a case where the status notifying beacon signal from the game apparatus 10 that is owned by a friend player or an acquaintance player cannot be received for a predetermined time period (180 seconds, for example), it is impossible to perform a battle-play because the game apparatus 10 is in an off-line state or does not exist in an area that the beacon signal reaches (at a closer distance). Accordingly, in such a case, the icon is displayed in a gray out manner.

After that, if the game apparatus 10 is made in an on-line state by performing the game processing of the single-play mode, or becomes within the area that the beacon signal reaches (in a short distance) a corresponding icon becomes to be displayed with a normal color and brightness. That is, it is possible to know in a real time the current situation by a change of the displaying manner of the icon.

Furthermore, in this embodiment, as for a player who owns another game apparatus 10 that becomes a communication-incapable state, by saving the information that is lastly received (information of the status notifying beacon signal), even in a case where the corresponding icon is being displayed in a gray out manner, it is possible to see the information of the player (profile, etc.). In a case where the other game apparatus 10 becomes in a communication-capable state, the information that is saved is updated with the newest information.

In addition, in this embodiment, the icon is displayed in a gray out manner in a case where the battle-play is being performed and in a case where the game apparatus is in an off-line state or not existing in a short-distance; however in order to make such cases distinguishable, a displaying manner of the icon may be changed. In the battle-play, the icon may be displayed in a normal color and brightness, for example, and an image or text indicating that the game apparatus is being in the battle-play may be displayed near the icon. This is true for a passer-by player described later.

In a case where the game IDs are coincident with each other and a player who is indicated by the player ID is not a friend player or an acquaintance player, it is determined whether the player has been determined as a passer-by player, that is, whether the player has been added in the displaying column.

In a case where the player has been added as a passer-by player, a displaying manner of an icon is changed according to the game situation. A change of the displaying manner is the same in a case of the icon of a friend player or an acquaintance player; however, in a case where a status notifying beacon signal from the game apparatus 10 that is owned by the player who has been added as a passer-by player cannot be received for a predetermined time period (180 seconds, for example), the icon is displayed in a gray out manner because the game apparatus 10 is in an off-line state or does not exist within a range that the beacon signal reaches.

In addition, in this embodiment, the icon of the player having the game apparatus 10 that is in an off-line state or does not exist within a range that the beacon signal reaches is displayed in a gray out manner; however, such the icon may be non-displayed.

Excepting a player whose current game situation is the battle-play or a player who is in an off-line state, in a case where an icon of a player (a friend player, an acquaintance player, and a passer-by player) who owns the game apparatus 10 that does not exist within a range that the beacon signal reaches is non-displayed, only an icon of a player who exists in the range that the beacon signal reaches (predetermined area) and is able to perform a battle-play is displayed in the list screen 150.

Thus, in a case where the local communication is selected, in the single-play mode, respective game apparatuses 10 send the status notifying beacon signal to one or more other game apparatuses 10, and receive a status notifying beacon signal from one or more other game apparatuses 10 to mutually search a candidate of the battle opponent. In addition, as a candidate of the battle opponent, one or more other game apparatuses 10 that exist within a predetermined area that the status notifying beacon signal can be sent and received, that is, one or more other players who exist in a relatively short-distance are searched.

Although it is determined whether the player is registered as a friend or determined as an acquaintance with referring to the player information (player data) included in the status notifying beacon signal in this embodiment, not limited to this. It may be determined whether the player is registered as a friend or determined as an acquaintance based on the identification information (device ID) of the one or more other game apparatuses 10.

In addition, in a case where the internet communication is selected, as similar to a case where the local communication is selected, the list screen 150 is updated (produced) in accordance with the current situation of the one or more other game apparatuses 10 that is notified from the server 5. However, since whether the game IDs are coincident with each other, that is, whether the same kind of game is being performed is determined (managed) in the server 5, such the determination processing is not performed in the game apparatus 10. Furthermore, as described above, in a case where the game situation is changed, the game apparatus 10 sends the status notifying data to the server 5, and therefore, a predetermined time period for determining whether the game apparatus 10 is in the off-line state or for determining whether the access point cannot be accessed is different depending on the single-play mode or battle-play mode. In a case where the game situation is the single-play mode, for example, the server 5 determines the game apparatus 10 which does not transmit the status notifying data even if 30 minutes to one (1) hour elapses is in the off-line state or cannot access the access point. Furthermore, in a case where the game situation indicates the battle-play mode, the server 5 determines the game apparatus 10 which does not transmit the status notifying data even if 180-540 seconds elapses is in the off-line state or cannot access the access point.

Thus, in a case where the internet communication is selected, in the single-play mode, the game apparatus 10 transmits the status notifying data to the server 5, and receives the current situation to which the player information of another game apparatus 10 is added from the server 5, that is, the game apparatuses 10 mutually search a candidate of the battle opponent. In such a case, the candidate of the battle opponent is an unspecified one or more other game apparatus 10 that is connected to the internet 7.

As described above, although the status notifying signal or data is transmitted even in a case where the game of the battle-play mode is being performed, this is for notifying to the one or more other game apparatuses 10 that the game apparatus 10 is performing the game processing of the battle-play. Although not shown, in the battle-play, since it is not necessary to select the battle opponent, the list screen 150 is not displayed.

In addition, in this embodiment, it is possible to select (switch) between the local communication and the internet communication as described above. As described above, since these communication methods are different from each other, in a case where the local communication or the internet communication is selected, if the communication method is switched, in most cases, it becomes impossible to perform a communication with the game apparatus 10 owned or used by the player who is determined as a passer-by player. Therefore, in a case where the communication method is switched from the local communication to the internet communication or from the internet communication to the local communication, the passer-by player may be erased once.

Figure 5:
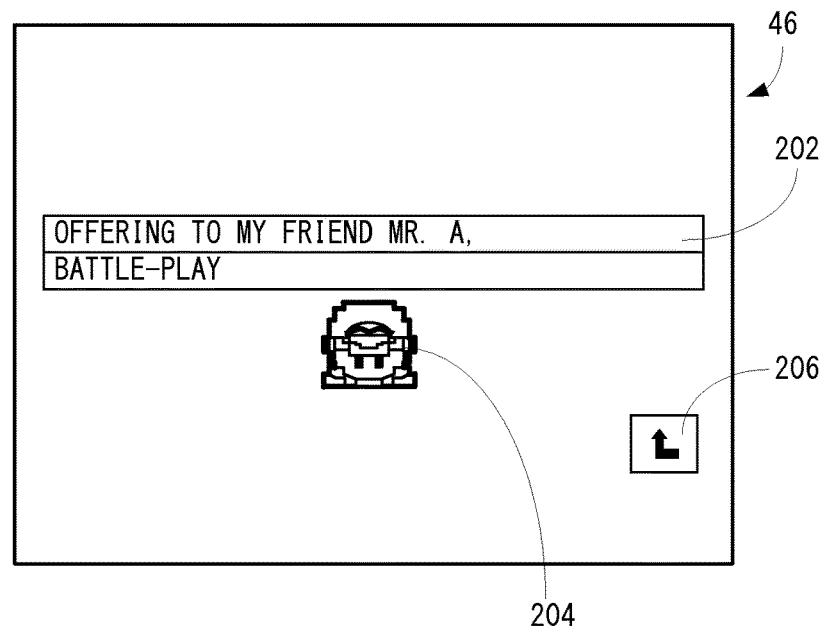
FIG. 5 is a view showing a non-limiting example offering screen displayed on the second LCD shown in FIG. 3.

In a case where the game processing of the single-play mode is performed, by selecting (touching) a desired icon (in FIG. 4(B), 170*a*, 170*b*, 172*a*-172*c*, and 174*a*-174*f*) in the list screen 150, it is possible to see the profile information of the corresponding player or send an offer of the battle-play to the corresponding player. When the icon 170*a* is selected in the list screen 150 shown in FIG. 4(B), for example, and an offer of the battle-play is sent (the battle-play is requested) to the corresponding player, a screen (an offering screen) 200 that is shown in FIG. 5 and for making an offer of the battle-play is displayed on the second LCD 46. At this time, although not shown, the game screen 100 of the single-play is still displayed in the first LCD 44, and therefore, the single-play is continued according to an operation by the player. Even if the offer of the battle-play is being sent, according to an operation by the player, the player character 102 and the monster character 104 are moved in the game world.

As shown in FIG. 5, the offering screen 200 includes a displaying region 202 at the center of the screen and an icon 204 below the displaying region 202. A button image 206 is displayed in a lower right portion of the offering screen 200. In the displaying region 202, information (text information) indicating to whom (what player) the offer of the battle-play is sent is displayed. The icon 204 is an icon that is applied with a face image of a game avatar that is used by an opponent player to whom the offer of the battle-play is sent. As seen from FIG. 5, the opponent player to whom the offer of the battle-play is sent is a friend player (a player corresponding to an icon 170*a*). Furthermore, by selecting (touching) the icon 204, it is possible to see the profile information of the corresponding player. The button image 206 is a button for returning to the list screen 150. When the button image 206 is turned-on (touched), the list screen 150 as shown in FIG. 4(B) is displayed on the second LCD 46. At this time, the offer of the battle-play may be canceled.

As described above, the offer of the battle-play to a player of one or more other game apparatuses 10 can be sent by utilizing the list screen 150 at an arbitrary timing during a time that the game of the single-play is being performed; however, it is impossible to send an offer of the battle-play in a state that the battle-play cannot be performed with one or more other game apparatuses 10 as in a case where the list screen 150 is not displayed.

Furthermore, if the offer of the battle-play is sent (the battle-play is requested), a signal for requesting the battle-play is sent from the game apparatus 10. This battle-play requesting signal includes information such as a kind ID, a device ID, a game ID, a player ID, an offer designation ID, etc. However, in a case where the local communication is selected, the game apparatus 10 sends (broadcasts) a beacon signal requesting the battle-play (the battle-play requesting beacon signal) with using the local communication module 30. On the other hand, in a case where the internet communication is selected, the game apparatus 10 sends data requesting the battle-play (the battle-play requesting data) to the server 5 with using the internet communication module 28.

The kind ID, the device ID, the game ID and the player ID are as described above. The offer designation ID is identification information (player ID) of an opponent player to whom the offer (request) of the battle-play is sent. In a case where the offering screen 200 of FIG. 5 is displayed on the second LCD 46, the player ID of the player corresponding to the icon 170*a* is included in the battle-play requesting beacon signal or the battle-play requesting data as the offer designation ID. A reason why the offer designation ID is thus included in the beacon signal is that it is to be determined at a side that receives the battle-play requesting beacon signal whether the battle-play is offered because the beacon signal is broadcasted, or that the player who is requested for the battle-play is to be specified by the server 5. In the internet communication, the server 5 sends, when the server 5 receives the battle-play requesting data, the battle-play requesting data to the game apparatus 10 that is owned by the player indicated by the offer designation ID. However, in the server 5, the connection information (IP address) for the game apparatus 10 that is owned by the player that the player ID indicates is stored corresponding to the player ID.

Figure 6:
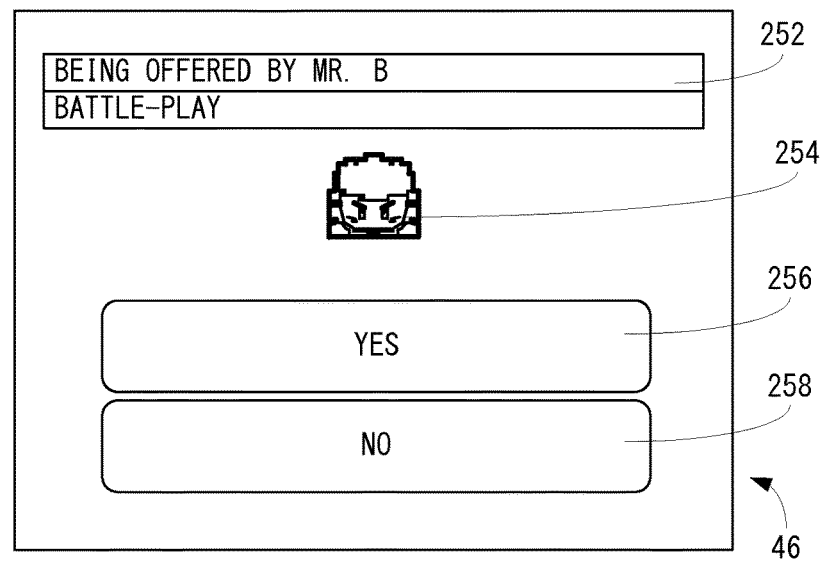
FIG. 6 is a view showing a non-limiting example offered screen displayed on the second LCD shown in FIG. 3.

On the other hand, in a case where an offer of the battle-play is sent (the battle-play is requested), a screen (an offered screen) 250 shown in FIG. 6 for a case where the battle-play is requested is displayed on the second LCD 46. At this time, although not shown, the game screen 100 of the single-play is still displayed on the first LCD 44, and the single-play is continued according to an operation by the player. Even when the offer of the battle-play is received, the player character 102 and the monster character 104 are moved in the game world according to an operation by the player while the offer is not responded to, that is, a response is being reserved. That is, even if an offer of the battle-play is received, the game is not suspended and a battle-play is not started as an interruption.

As shown in FIG. 6, in the offered screen 250, a displaying region 252 is formed in an upper portion thereof, and an icon 254 is displayed below the displaying region 252. Furthermore, below the icon 254, an icon 256 and an icon 258 are displayed.

In the displaying region 252, information (text information) indicating from what player the offer of the battle-play is received is displayed. In the text information, information on whether the player requesting the battle-play is a friend, an acquaintance or a passer-by is also included. Therefore, since the player can discern the classification of the player who requests the battle-play, it is possible for the player to determine whether the offer of the battle-play is to be accepted with considering the classification. If the offer of the battle-play is from the acquaintance player, for example, it is possible for the player to perform the battle-play with a security feeling in comparison with a case the battle-play is to be performed with the passer-by because the battle-play or the character exchange is performed with the acquaintance player at least one time. In addition, if the offer of the battle-play is from a friend player, since it is adequately considered that a degree of closeness and reliability are higher than those of the acquaintance player, it is possible for the player to perform the battle-play with more security feeling.

The icon 254 is an icon that is applied with a face image of a game avatar that is used by a player who sends an offer of the battle-play. As seen from FIG. 6, the battle-play is offered by an acquaintance player corresponding to the icon 172*a* that is displayed on the list screen 150. By selecting (touching) the icon 254, it is possible to see the profile information of the corresponding player. The icon 256 is a button for accepting the offer of the battle-play. The icon 258 is a button for refusing the offer of the battle-play.

In a case where the offered screen 250 is displayed, if the icon 256 is turned-on (touched), a signal indicating that the offer of the battle-play is accepted is sent from the game apparatus 10. The offer accepting signal includes the kind ID, the device ID, the game ID, the player ID and the offer source ID, etc. However, in a case where the local communication is selected, the game apparatus 10 sends (broadcasts) a beacon signal indicating that the offer is accepted (an offer accepting beacon signal) with using the local communication module 30. In a case where the internet communication is selected, the game apparatus 10 sends data indicating that the offer is accepted (offer accepting data) to the server 5 with using the internet communication module 28.

The kind ID, the device ID, the game ID and the player ID are as described above, and the offer source ID is identification information (player ID) of an opponent player who sends an offer of the battle-play (requests the battle-play). A reason why the offer source ID is included in the beacon signal is that in a case where the local communication is selected, it is necessary to determine that the offer of the battle-play is accepted at a side that receives the offer accepting beacon signal because the offer accepting beacon signal is broadcasted, or that the player that the offer of the battle-play is accepted is to be specified by the server 5. In the internet communication, the server 5 sends, when receiving the offer accepting data, the offer accepting data to the game apparatus 10 that is owned by the player indicated by the source ID.

In a case where the offered screen 250 is displayed, when the icon 258 is turned-on (touched), the game apparatus 10 sends a beacon signal or data (offer refusing beacon signal or offer refusing data) for refusing the offer of the battle-play.

The offer refusing beacon signal or the offer refusing data is the same as the offer accepting beacon signal or data except that a kind indicated by the kind ID differs.

In addition, in this embodiment, in a case where there is no response within a predetermined time period (30-60 seconds, in this embodiment) after the offered screen 250 is displayed, the offer refusing beacon signal or the offer refusing data is automatically sent even if the icon 258 is not turned-on (touched).

Thus, even if an offer of the battle-play is received, the battle-play is not automatically started as an interruption, and it is possible to continue the game of the single-play by reserving a response (acceptance or refusal) to the offer. Then, if the game of the single-play is continued without sending a response, the offer of the battle-play can be automatically refused. That is, the player is not troubled.

In this embodiment, although the predetermined time period is counted from a time point that the offered screen 250 becomes to be displayed, not limited to this. The predetermined time period may be counted from a time point that the battle-play requesting beacon signal or the battle-play requesting data is received.

Furthermore, the predetermined time period may be counted by the game apparatus 10 at a side that sends the battle-play requesting beacon signal or the battle-play requesting data, and in a case where no response is sent within the predetermined time period from the game apparatus 10 that is at a receiving side, the game apparatus 10 that is at the sending side may automatically cancel the offer of the battle-play.

As described above, it is possible to send an offer of the battle-play to the players of one or more other game apparatuses 10, or accept or refuse an offer of the battle-play from the player of one or more other game apparatuses 10 in accordance with an operation by the player.

In a case where the offer of the battle-play is accepted, in order to start the battle-play, the game apparatus 10 of the player who sends an offer of the battle-play and the game apparatus 10 of the player who accepts the offer respectively suspend the game processing of the single-play mode, and a connection between these game apparatuses 10 is established to send/receive the data. In a case where the local communication is selected, a connection for performing transmission/reception of the data between the game apparatuses 10 is established with using the local communication module 30. On the other hand, in a case where the internet communication is selected, the server 5 notifies the connection information (IP address) of the game apparatus 10 of the battle opponent to the plurality of game apparatuses 10 that perform the battle-play, and then, a connection for performing transmission/reception of the data between the plurality of game apparatuses 10 is established with using the internet communication module 28.

If the connection is established, the game processing of the battle-play mode (hereinafter, called as "battle-play processing") can be performed. At this time, the game apparatus 10 at a side that offers the battle-play functions as a parent machine and the game apparatus 10 at a side that the battle-play is offered functions as a child machine, for example. The parent machine receives operation data of the child machine and performs game control processing of the battle-play mode based on the operation data of the child machine that is received and operation data of the own apparatus, and produces a game image according to a processing result and outputs the game image (for screen displaying and so on), and further sends data of the processing results (processing result data) to the child machine. The child machine produces and outputs a game image according to the processing data result that is received.

In addition, if the connection is established, since the battle-play processing mode is started, the offer of the battle-play can be referred to as a request for connection (communication connection).

In the battle-play mode, the monster character that is used by the player who offers the battle-play and the monster character that is used by the player who accepts the offer are arranged in the game world, and in accordance with operations of the respective players, and attack another monster character mutually or defend an attack by another monster character.

If the battle-play is settled and thus the battle-play processing is ended, the game processing of the single-play mode that is suspended is re-started, for example. When the game processing of the single-play mode is suspended, the game data that is used for the game processing of the single-play mode (single-play processing data 504f) is saved, and read out at the re-start. Therefore, it is possible to re-start the game processing of the single-play mode from a time point that the same is suspended.

As described above, in this embodiment, a player who performs the battle-play once is determined as an acquaintance, and accordingly, when the battle-play is ended, in a case where the battle opponent at this time is a passer-by player, the player is then determined as an acquaintance, and the player data of the player is stored in the data saving memory 26 of the game apparatus 10 as the save data together with the game data of the battle-play game. Here, it may be displayed that the passer-by player who is the battle opponent becomes an acquaintance.

Furthermore, in this embodiment, when the battle-play is ended, in a case where the battle opponent at this time is an acquaintance player, it is possible to select (determine) whether the player is to be registered as a friend. For example, if the battle-play is ended, in a case where the battle opponent at this time is an acquaintance player, a friend registering screen 300 as shown in FIG. 7 is displayed on the second LCD 46.

Figure 7:
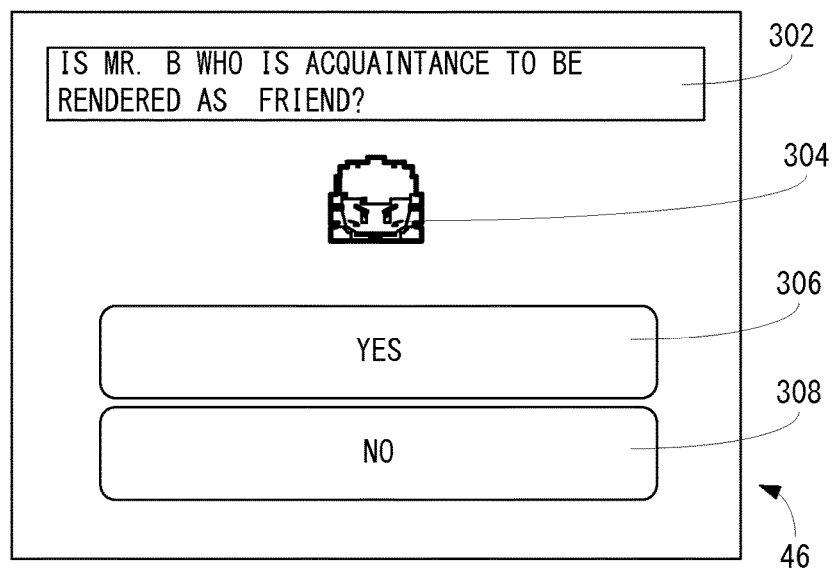
FIG. 7 is a view showing a non-limiting example friend registering screen displayed on the second LCD shown in FIG. 3.

As shown in FIG. 7, in the friend registering screen 300, a displaying region 302 is formed at an upper portion thereof, and an icon 304 is displayed below the displaying region 302. Furthermore, below the icon 304, an icon 306 and an icon 308 are displayed.

In the displaying region 302, text information on whether the battle opponent at this time (here, person B) is to be registered as a friend player. The icon 304 is an icon to which a face image of the game avatar used by the acquaintance player who is the battle opponent at this time is applied. By selecting (touching) this icon 304, it is possible to see the profile information of the corresponding player (person B). The icon 306 is a button for selecting that the acquaintance player who is the battle opponent at this time is to be registered as a friend player. Furthermore, the icon 308 is a button for selecting that the acquaintance player who is the battle opponent at this time is not registered as a friend player.

In a case where the friend registering screen 300 is being displayed, for example, if the icon 306 is turned-on (touched), it is sent (notified) to the game apparatus 10 used by an acquaintance player who is the battle opponent at this time that the acquaintance player is to be registered as a friend player. On the other hand, if it is notified from the game apparatus 10 used by an acquaintance player who is the battle opponent at this time that the player of the game apparatus 10 is to be registered as a friend player, a mutual agreement on the registration as a friend player is reached. That is, mutual authentication is performed. Therefore, in each game apparatus 10, an acquaintance player who is the battle opponent at this time is registered as a friend player. This is, different from a method for registering a friend player by the aforementioned original function, a method for registering as a friend player by performing the game (application). That is, in the game of the embodiment, if the battle-play is performed or a character is exchanged with a passer-by player once, the passer-by player is determined as an acquaintance, and if the battle-play (may be exchanging a character) with an acquaintance player is performed, based on a mutual agreement, the acquaintance player can be registered as a friend player.

In addition, in a case where the friend registering screen 300 is being displayed, even if the icon 306 is turned-on, if there is no notification of friend registration from the game apparatus 10 used by the acquaintance player who is the battle opponent at this time, since a mutual agreement is not obtained on the registration as the friend player, the acquaintance player is not registered as a friend player.

Furthermore, in a case where the friend registering screen 300 is being displayed, if the icon 308 is turned-on (touched), it is selected that the battle opponent at this time is not registered as a friend player. In such a case, if it is notified of friend registration from the game apparatus 10 used by the acquaintance player who is the battle opponent at this time, since no mutual agreement is reached on the registration as the friend player, the acquaintance player is not registered as a friend player.

As described above, functions available between the game apparatus 10 and the game apparatus 10 used (owned) by the respective players differs in a case of the acquaintance player or the friend player and therefore, according to a function to be used, it may be determined whether the acquaintance player is to be registered as a friend player. Furthermore, it may be displayed that the acquaintance player is registered as a friend player or not registered as a friend player.

Figure 8:
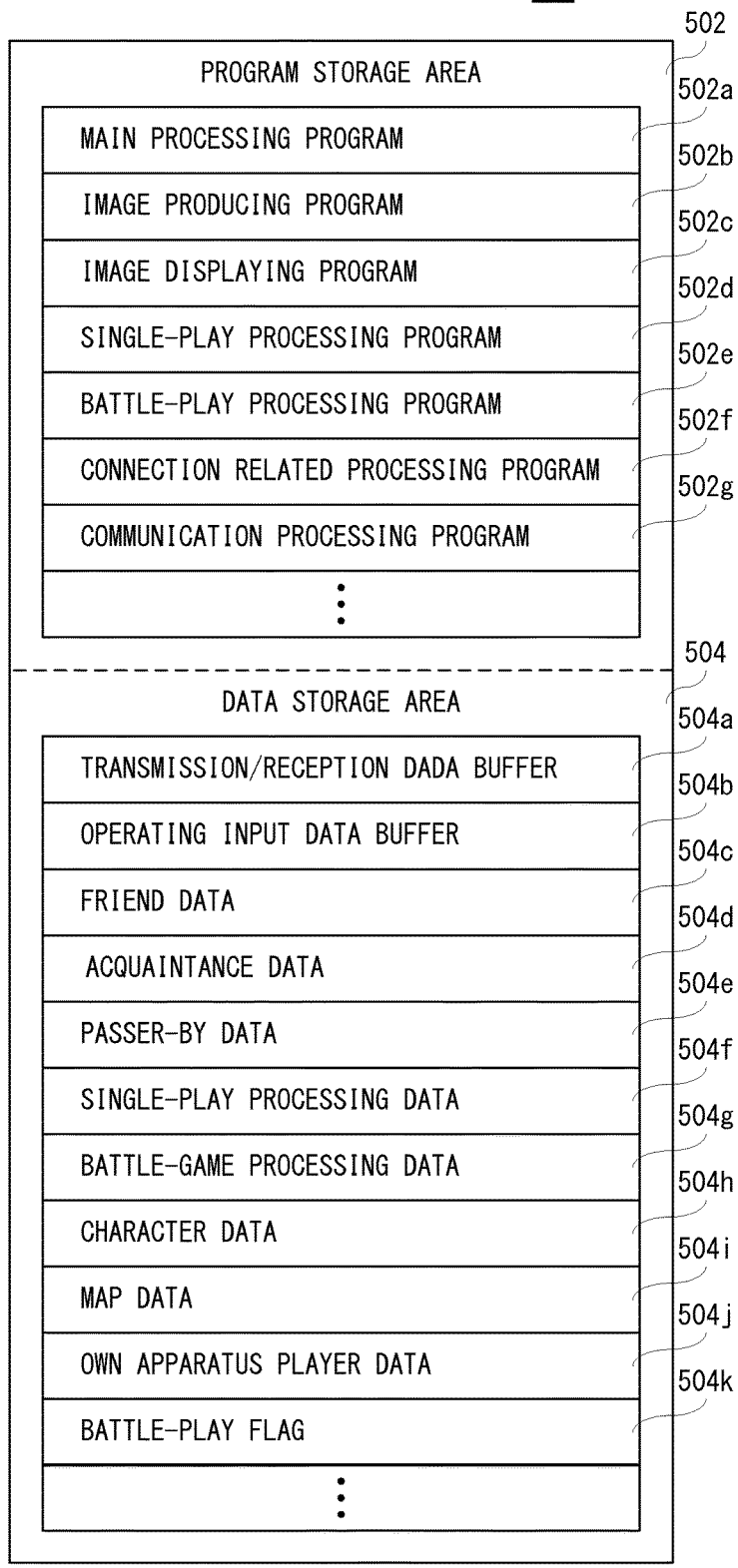
FIG. 8 is a view showing a non-limiting example memory map of a main memory shown in FIG. 3.

FIG. 8 is a view showing one example of a memory map 500 of the main memory 22 of the game apparatus 10 shown in FIG. 2. As shown in FIG. 8, the main memory 22 includes a program storage area 502 and a data storage area 504. The program storage area 502 is stored with a game program that is an application program being an example of an information processing program. The game program is constructed by a main processing program 502a, an image producing program 502b, an image displaying program 502c, a single-play processing program 502d, a battle-play processing program 502e, a connection related processing program 502f, a communication processing program 502g, etc.

The main processing program 502a is a program for a main routine (entire game processing) of the game of this embodiment. The image producing program 502b is a program for producing image data for various kinds of screens (100, 150, 200, 250, etc.) by using data such as polygon data and texture data. The image displaying program 502c is a program for outputting the image data that is produced according to the image producing program 502b to the first LCD 44 and the second LCD 46.

The single-play processing program 502d is a program for the game processing of the single-play mode. The battle-play processing program 502e is a program for the game processing of the battle-play mode. The connection related processing program 502f is a program that sends an offer of the battle-play to one or more other game apparatuses 10, or receives the offer of the battle-play from one or more other game apparatuses 10, and responds to (accepts or refuses) the offer of the battle-play from one or more other game apparatuses 10, during a time that the game processing of the single-play mode is being performed. The communication processing program 502g is a program for performing a communication with using the internet communication module 28 or the local communication module 30.

In addition, the program storage area 502 is also stored with a sound outputting program, a back-up program, etc. The sound outputting program is a program for producing and outputting a game sound (music). The back-up program is a program for saving the game data in accordance with an instruction by the player or a predetermined event.

The data storage area 504 is provided with a transmission/reception data buffer 504a and an operating input data buffer 504b.

The transmission/reception data buffer 504a is an area for temporarily storing data (including the beacon signal) that is sent/received to or from one or more other game apparatuses 10. The operating input data buffer 504b is an area for temporarily storing operation data and touch position data from the input device 32.

The data storage area 504 is further stored with friend data 504c, acquaintance data 504d, passer-by data 504e, single-play processing data 504f, battle-play processing data 504g, character data 504h, map data 504i, own apparatus player data 504j, etc.

The friend data 504c is player data of a player who is registered as a friend player. The player data includes, as shown in FIG. 9, information such as a player ID, a name of player, profile information, avatar information, a game situation, etc. These are player information that is included in the status notifying beacon signal or the status notifying data. Since the player data is stored for each player, in a case where a plurality of players are registered (stored), the player data is stored corresponding to each of the players. This is true for the acquaintance data 504d and the passer-by data 504e.

The acquaintance data 504d is player data for a player who is determined as an acquaintance player. The passer-by data 504e is player data for a player who is not registered as a friend player and is not determined as an acquaintance player, and a player of the game apparatus 10 that is a transmission source of the status notifying beacon signal or the status notifying data that is received by the game apparatus 10.

As described above, the player data of the friend player and the acquaintance player are stored in the data saving memory 26, and therefore, the friend data 504c and the acquaintance data 504d are read-in (loaded) to the data storage area 504 from the data saving memory 26 at a time of game start.

The single-play processing data 504f is data that is utilized for the game processing of the single-play mode. As shown in FIG. 10, the single-play processing data 504f includes current position data, level data, possessing item data, possessing character data, etc. The current position data is data (coordinates data) of a current position of the player character in the virtual space. The level data is data indicative of levels of the player character and the monster character that is possessed by the player character. The possessing item data is information (data) for identifying an item that is possessed by the player character. The possessing character data is information (data) for identifying a monster character that is possessed by the player character.

Returning to FIG. 8, the battle-play processing data 504g is data that is utilized for the game processing of the battle-play mode. As shown in FIG. 11, the battle-play processing data 504g includes reception data and battle opponent data. The reception data is data that is received from the game apparatus 10 of the battle opponent. In a case where the game apparatus 10 functions as a parent machine, the reception data is operating input data that is received from the game apparatus 10 of the battle opponent, functioning as a child machine. In contrast, in a case where the game apparatus 10 functions as a child machine, the reception data is the processing result data that is received from the game apparatus 10 of the battle opponent, functioning as a parent machine. The processing result data is data of a result that the game processing of the battle-play mode is performed based on the operating input data of the parent machine and/or the operating input data from the child machine. The child machine updates the game parameter and the game screen based on the processing result data. The battle opponent data is data of the player ID for the battle opponent (the player with whom the battle-play is performed).

Returning to FIG. 8, the character data 504h is data of various kinds of characters (player character, monster character, etc.) used in the game of this embodiment. The map data 504i is data for constructing a game world according to this embodiment in a virtual space.

The own apparatus player data 504j is player data that is registered for a player (owner) who owns the game apparatus 10. A content of the own apparatus player data 504*j* is the same as the player data shown in FIG. 9.

The data storage area 504 is further provided with a battle-play flag 504*k* that is a flag for determining whether the battle-play is being currently performed. The battle-play flag 504*k* is constituted by a 1-bit register, for example, and in a case where the battle-play is being performed, "1" is set in the register, and in a case where the battle-play is not being performed, "0" is set in the register. The battle-play flag 504*k* is turned-on at a time that the battle-play is started and turned-off at a time that the battle-play is ended.

Figure 12:
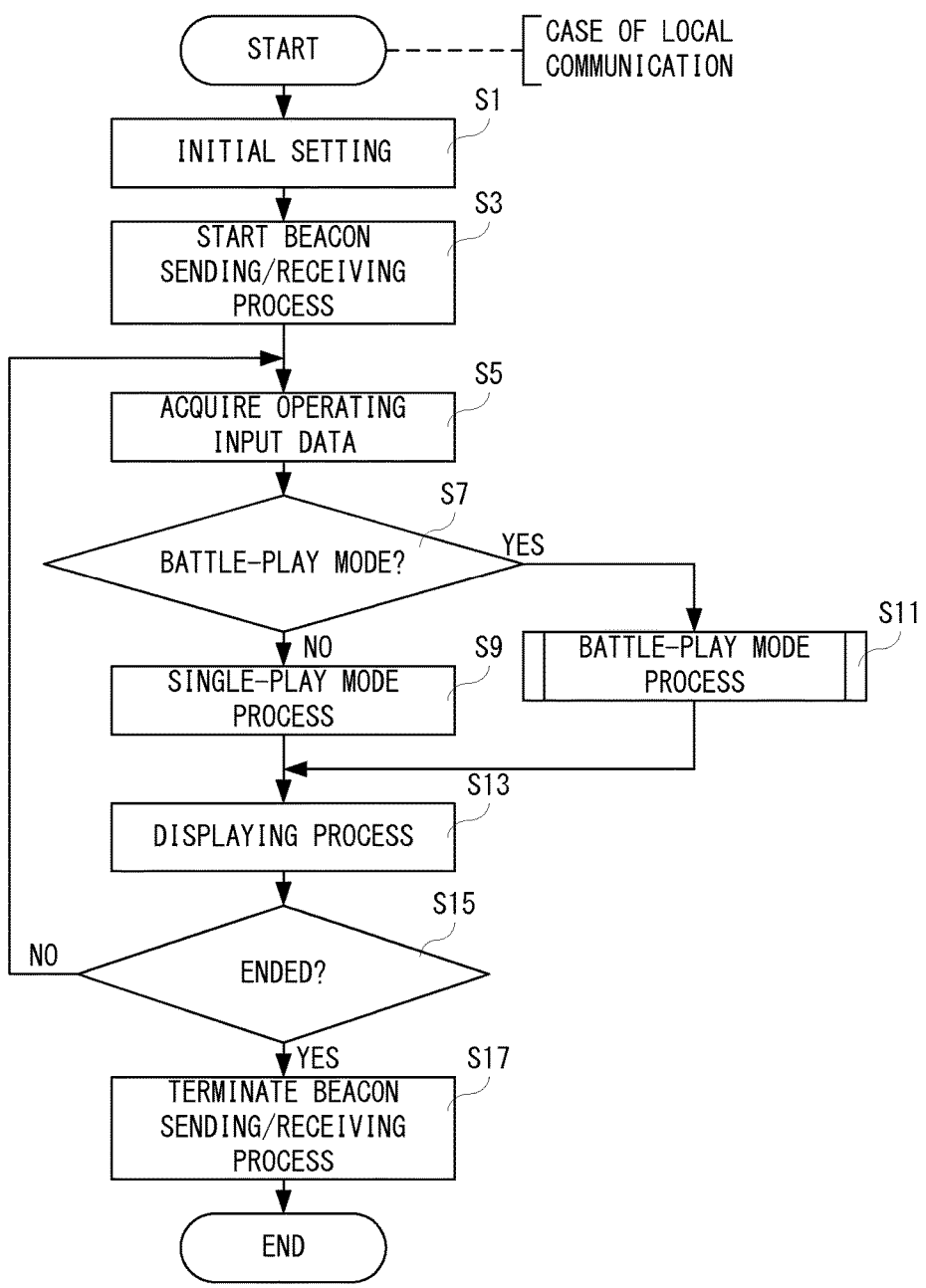
FIG. 12 is a flowchart showing a non-limiting example entire game process by a CPU shown in FIG. 3.

FIG. 12 is a flowchart showing an entire game process of the CPU 20 shown in FIG. 3. It should be noted that the entire game process in a case where the local communication is selected is shown. In addition, the processing in the respective steps of the flowcharts shown in FIG. 12 (the same is true for FIG. 13 to FIG. 17, described later) are only examples and therefore, as far as the same or similar results can be obtained, a processing order or sequence of the respective steps may be exchanged. Furthermore, this embodiment will be described on an assumption that the processing of the respective steps in the flowchart shown in FIG. 12 to FIG. 17 are performed by the CPU 20; however, a part of the steps may be performed by a processor(s) or a dedicated circuit(s) other than the CPU 20.

As shown in FIG. 12, when the entire game process is started, the CPU 20 performs an initial setting in a step S1 wherein a game world of the single-play is constructed, a character such as a player character is positioned at an initial position or a position that is saved, and so on. In a next step S3, a beacon sending/receiving process (see FIG. 16 and FIG. 17) described later is started. That is, the beacon sending/receiving process is performed in parallel with the entire game process.

In a next step S5, operating input data is acquired. Here, the CPU 20 acquires operation data and/or touch position data stored in the operating input data buffer 504*b*. It is a matter of course, but in a case where the operation data and/or touch position data is not stored in the operating input data buffer 504*b*, in the step S5, the operation data and/or touch position data is not acquired, and then, the process proceeds to a step S7 with no operation.

In a next step S7, it is determined whether the battle-play is being currently performed. Here, the CPU 20 determines whether the battle-play flag 504*k* is turned-on.

If "NO" is determined in the step S7, that is, when the single-play is currently performed, a single-play process is performed in a step S9, and then, the process proceeds to a step S13. Although a detailed description is omitted here, in the single-play process, the game processing of the single-play is performed, and in response to the reception of the status notifying beacon signal, the image data of the list screen 150 is updated. Therefore, icons corresponding to a friend player, an acquaintance player and a passer-by player are added, and/or the displaying manner of the icon is changed. In addition, in accordance with the operation by the player, the offer of the battle-play is sent to another game apparatus or the offer of the battle-play from another game apparatus 10 (player) is received. Then, if the offer of the battle-play is accepted by the candidate of the battle opponent or if an acceptance of the offer of the battle-play is sent to the battle opponent, the mutual agreement for performing the battle-play is reached, and therefore, the battle-play is determined to be performed.

In contrast, if "YES" is determined in the step S7, that is, when the battle-play is currently performed in a step S11, a battle-play process (see FIG. 13 to FIG. 15) described later is performed, and then, the process proceeds to the step S13. In the step S13, a displaying process is performed. In this embodiment, the CPU 20 outputs image data to the first LCD 44 and the second LCD 46, respectively. Although not shown, a game sound is also output at this time.

Subsequently, in a step S15, it is determined whether the game is to be ended. Here, the CPU 20 determines whether an end of the game is instructed by the player. If "NO" is determined in the step S15, that is, if the game is not to be ended, the process returns to the step S5. In contrast, if "YES" is determined in the step S15, that is, when the game is to be ended, in a step S17, the beacon sending/receiving process is terminated, and then, the entire game process is terminated.

In addition, a scan time of the steps S5-S15 is executed by one (1) frame, and one frame is a time interval for updating a screen (1/30 seconds or 1/60 seconds), for example.

Figure 16:
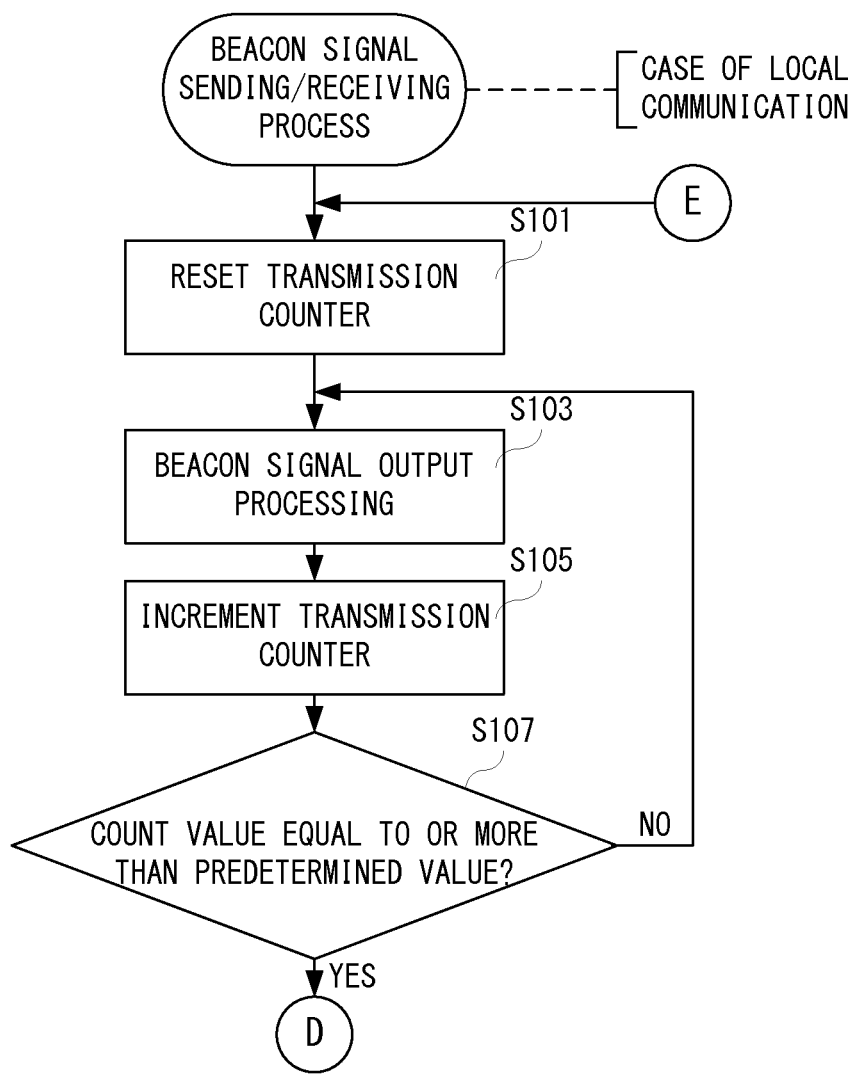
FIG. 16 is a flowchart showing a non-limiting example part of a beacon sending/receiving process by the CPU shown in FIG. 3.
Figure 17:
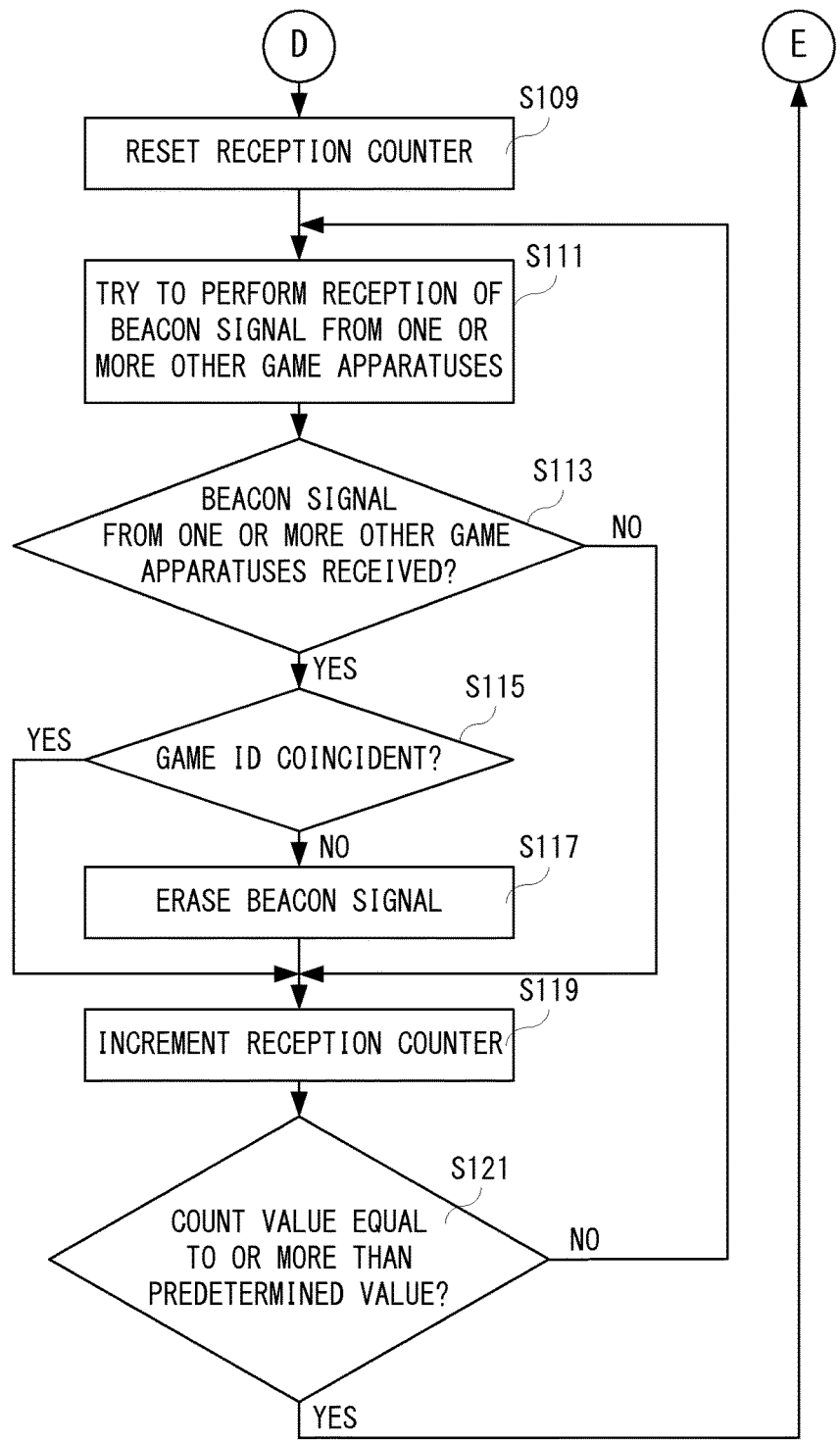
FIG. 17 is a flowchart showing a non-limiting example further part of the beacon sending/receiving process by the CPU shown in FIG. 3, following FIG. 16.

Furthermore, as described above, in a case where the internet communication is selected, at a time that the game situation is changed, the status notifying data is sent to the server 5. Therefore, in such a case, a beacon signal sending/receiving process as shown in FIG. 16 and FIG. 17 is not performed. Furthermore, as described above, in a case where the internet communication is selected, in the step S3, it is notified to the server 5 that the game is started. More specifically, a start notification including the game ID and the player information is sent to the server 5. Furthermore, in the step S17, it is notified to the server 5 that the game is ended. More specifically, an end notification including the game ID and the player information is sent to the server 5.

Figure 13:
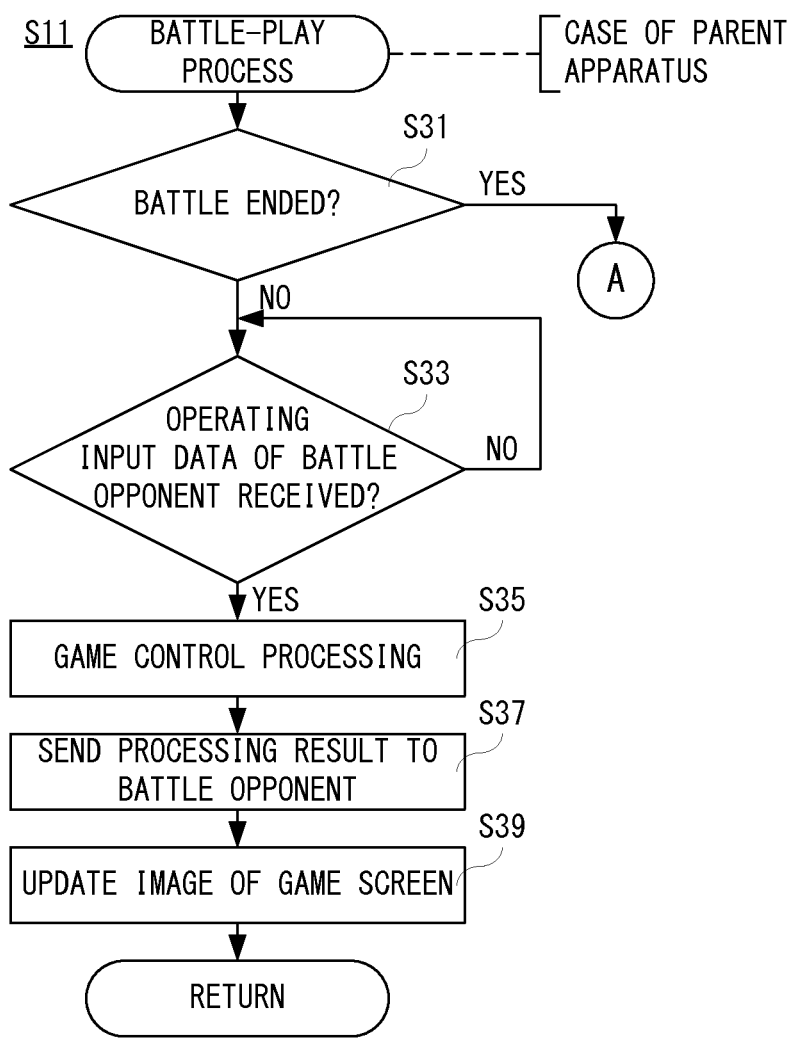
FIG. 13 is a flowchart showing a non-limiting example part of a battle-play game process by the CPU shown in FIG. 3.
Figure 14:
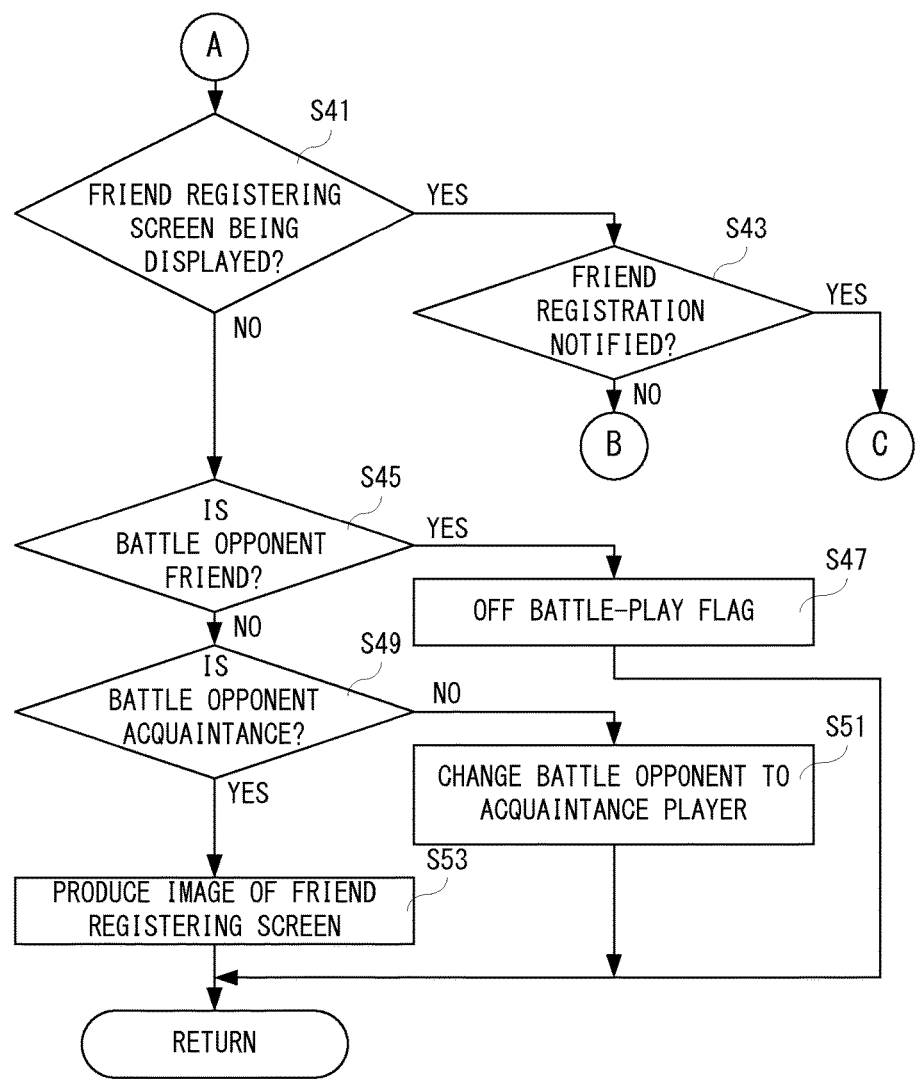
FIG. 14 is a flowchart showing a non-limiting example further part of the battle-play game process by the CPU shown in FIG. 3, following FIG. 13.
Figure 15:
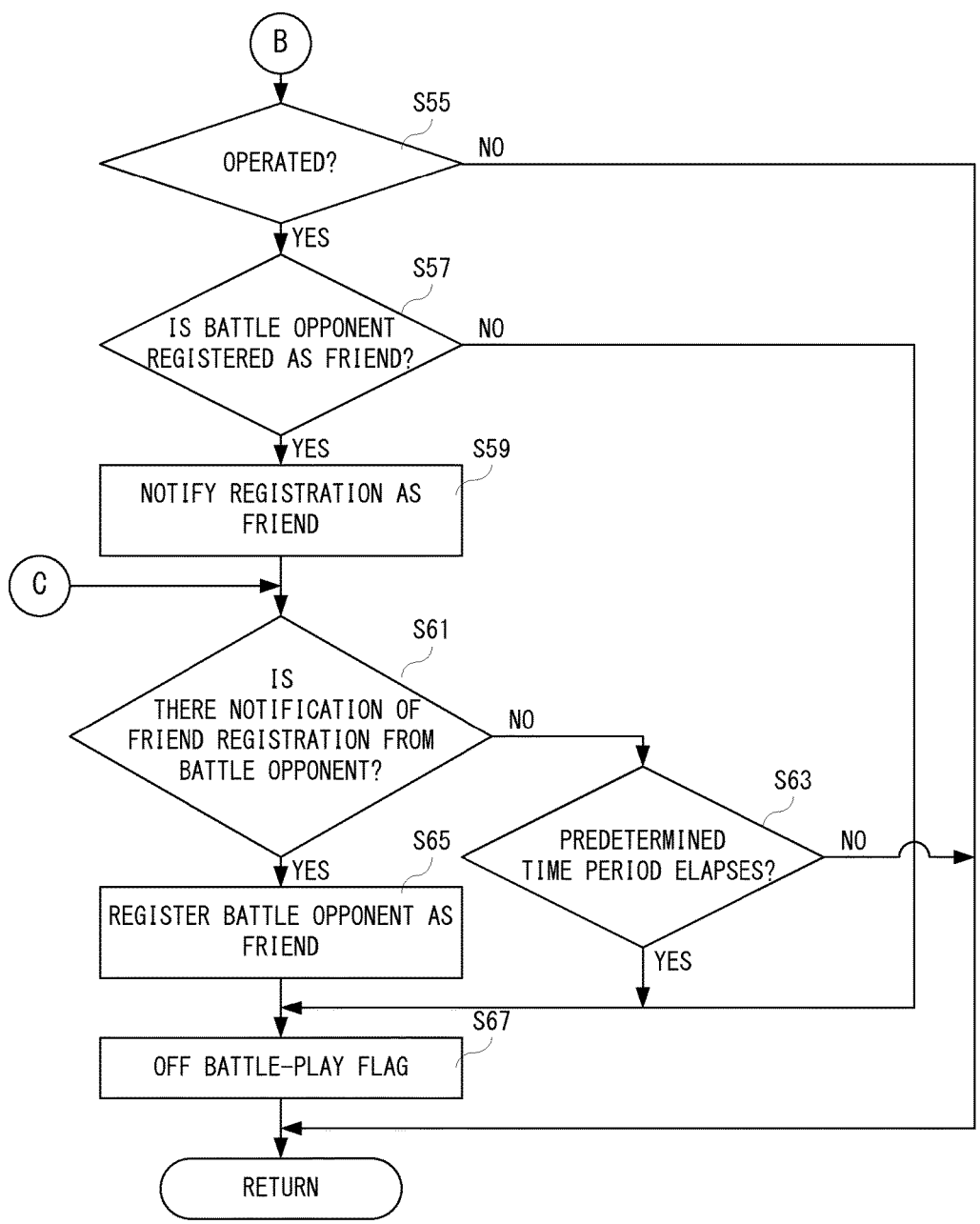
FIG. 15 is a flowchart showing a non-limiting example still further part of the battle-play game process by the CPU shown in FIG. 3, following FIG. 14.

FIG. 13 to FIG. 15 are examples of a flowchart of the battle-play process shown in the step S11 in FIG. 12. It should be noted that the battle-play process shown in FIG. 13 to FIG. 15 is a process of a case where the game apparatus 10 functions as a parent apparatus. Although not shown, prior to starting the battle-play, the game apparatus 10 establishes a communication connection with the game apparatus 10 of the battle opponent, and performs an initial setting. In addition, at this time, the battle-play flag 504*k* is turned-on. As the initial setting, the CPU 20 constructs a game world for the battle-play, and arranges characters such as a player character, etc. at initial positions thereof.

As shown in FIG. 13, in the battle-play process, the CPU 20 determines whether the battle is ended in a step S31. Here, the CPU 20 determines whether win or loss of the battle-play is decided. If "YES" is determined in the step S31, that is, if the battle is ended, the process proceeds to a step S41 shown in FIG. 14. On the other hand, if "NO" is determined in the step S31, that is, if the battle is not ended, in a step S33, it is determined whether the operating input data of the opponent is received. If "NO" is determined in the step S33, that is, if the operating input data of the opponent is not received, the process returns to the same step S33 without no operation. On the other hand, if "YES" is determined in the step S33, that is, if the operating input data of the opponent is received, the process proceeds to a step S35.

In addition, in this embodiment, in a case where the operating input data of the opponent is not received in the step S33, the process returns to the same step S33 as it is; however, if the operating input data of the opponent is not received within a predetermined time period (2-3 seconds, for example), the process may proceed to the step S35.

In the step S35, game control processing for the battle-play is performed. Briefly described, the CPU 20 brings the monster character 104 of the own apparatus and the monster character of the opponent into action (attack and/or defense)

based on at least one of the operating input data of the own apparatus that is acquired in the step S5 and the operating input data of the opponent that is determined to be received (acquired) in the step S33. Furthermore, the CPU 20 subtracts a strength value (体力値) of the monster character that receives the attack. Then, the CPU 20 decides win or loss of the battle-play if the strength value (体力値) of one of the monster characters becomes equal to or less than "0".

In a next step S37, a processing result is sent to the battle opponent. That is, the CPU 20 sends to the game apparatus 10 of the battle opponent the processing result data by the game control processing in the step S35. An image of the game screen is updated in a step S39, and then, the process returns to the entire game process shown in FIG. 12. In the step S39, the CPU 20 produces image data that reflects a result of the game control processing in the step S35. Therefore, in the entire game process thereafter, the game screen that reflects a result of the game control processing is displayed on the first LCD 44.

As described above, if the battle is ended, "YES" is determined in the step S31. In the step S41 as shown in FIG. 14, it is determined whether the friend registering screen 300 as shown in FIG. 7 is being displayed. If "YES" is determined in the step S41, that is, if the friend registering screen 300 is being displayed, in a step S43, it is determined whether a friend registration is notified to the game apparatus 10 of the battle opponent. If "NO" is determined in the step S43, that is, if the friend registration is not notified to the game apparatus 10 of the battle opponent, the process proceeds to a step S55 shown in FIG. 15. On the other hand, if "YES" is determined in the step S43, that is, if the friend registration is notified to the game apparatus 10 of the battle opponent, the process proceeds to a step S61 shown in FIG. 15.

Furthermore, if "NO" is determined in the step S41, that is, if the friend registering screen 300 is not being displayed, in a step S45, it is determined whether the battle opponent at this time is a friend player. Here, the CPU 20 detects that the player data having the player ID indicated by the battle opponent data included in the battle-play processing data 504g is included in any one of the friend data 504c, the acquaintance data 504d and the passer-by data 504e to determine whether the battle opponent at this time is a friend player. In addition, the same or similar processing is performed in a step S49 described later.

If "YES" is determined in the step S45, that is, if the battle opponent at this time is a friend player, the battle-play flag 504k is turned-off in a step S47, and then, the process returns to the entire game process. Therefore, in the entire game process thereafter, the single-play processing is re-started. On the other hand, if "NO" is determined in the step S45, that is, if the battle opponent at this time is not a friend player, in the step S49, it is determined whether the battle opponent at this time is an acquaintance player. If "NO" is determined in the step S49, that is, if the battle opponent at this time is a passer-by player, in a step S51, it is determined that the battle opponent at this time is an acquaintance player, and therefore, the battle opponent is changed to an acquaintance player, and then, the process returns to the entire game process. Here, the CPU 20 moves the player data of the battle opponent at this time from the passer-by data 504e to the acquaintance data 504d.

On the other hand, if "YES" is determined in the step S49, that is, the battle opponent at this time is an acquaintance player, image data for the friend registering screen 300 is produced in a step S53, and then, the process returns to the entire game process. Therefore, in the entire game process thereafter, the friend registering screen 300 is displayed in the second LCD 46.

If the friend registering screen 300 is being displayed but the friend registration is not notified to the game apparatus 10 of the battle opponent, as described above, "NO" is determined in the step S43, and then, as shown in FIG. 15, it is determined whether an operation is made in the step S55. Here, the CPU 20 determines whether the operation data and/or the touch position data is stored in the operating input data buffer 504b.

If "NO" is determined in the step S55, that is, if no operation is made, the process returns to the entire game process with no operation. In addition, in this embodiment, in a case where no operation is made, the process returns to the entire game process as it is; however, the process may proceed to a step S67 in a case where no operation is made even if a predetermined time period (5-10 seconds, for example) elapses after the friend registering screen 300 becomes to be displayed.

On the other hand, if "YES" is determined in the step S55, that is, if an operation is made, in a step S57, it is determined whether the battle opponent is to be registered as a friend player. Here, the CPU 20 determines whether the battle opponent is to be registered as a friend player by detecting that the icon 306 or the icon 308 is turned-on.

If "NO" is determined in the step S57, that is, if the icon 308 is turned-on, it is determined that the battle opponent is not registered as a friend player, and the process proceeds to the step S67. On the other hand, if "YES" is determined in the step S57, that is, if the icon 306 is turned-on, it is determined that the battle opponent is to be registered as a friend player, and in a step S59, it is notified to the game apparatus 10 owned (used) by the battle opponent that the battle opponent is registered as a friend (friend registration).

Subsequently, in the step S61, it is determined whether there is a notification of the friend registration from the battle opponent. If "NO" is determined in the step S61, that is, if a notification of the friend registration from the battle opponent is not received, in a step S63, it is determined whether the predetermined time period (5-10 seconds, for example) elapses after the friend registering screen 300 becomes to be displayed. If "NO" is determined in the step S63, that is, if the predetermined time period does not elapse after the friend registering screen 300 is displayed, the process returns to the entire game process with no operation. On the other hand, if "YES" is determined in the step S63, that is, if the predetermined time period elapses after the friend registering screen 300 is displayed, the process proceeds to the step S67.

If "YES" is determined in the step S61, that is, if there is a notification of the friend registration from the battle opponent, it is determined that a mutual agreement on registration of the battle opponent as a friend player is reached, and in a step S65, the battle opponent is registered as a friend player. Here, the CPU 20 moves the player data of the battle opponent from the acquaintance data 504d to the friend data 504c. Then, the battle-play flag 504k is turned-off in the step S67, and then, the process returns to the entire game process.

In addition, the above-described description is made on a case where the game apparatus 10 functions as a parent apparatus, but in a case where the game apparatus 10 functions as a child apparatus, instead of the steps S33, S35 and S37, the following processing is performed.

More specifically, if it is determined that the battle-play is not ended in the step S31, the CPU 20 sends the operating input data of the own apparatus that is acquired in the step S5 to the game apparatus 10 (parent apparatus) owned by the battle opponent. Then, the CPU 20 determines whether the processing result data is received from the parent apparatus. In a case where the processing result data is not received, the CPU 20 waits for the reception of the processing result data, and if the processing result data is received, in a step S39, the CPU 20 renews an image of the game screen according to the processing result data.

FIG. 16 and FIG. 17 shows a flowchart of a beacon sending/receiving process; however, the beacon sending/receiving process is performed in a case where the local communication is selected.

As shown in FIG. 16, the CPU 20 resets a transmission counter in a step S101, when the beacon sending/receiving process is started. That is, a count value is set to "0". Although not shown, the transmission counter (as the same for "reception counter" described later) is provided in the data storage area 504 of the main memory 22.

In a succeeding step S103, beacon signal output processing is performed. Here, the beacon signal that is produced in the step S47, S77, S83 or S91 and registered in the transmission/reception data buffer 504a is sent (broadcasted). In a succeeding step S105, the transmission counter is incremented. That is, "1" is added to a count value of the transmission counter. Then, in a step S107, it is determined whether the count value of the transmission counter is equal to or more than a predetermined value. In addition, the predetermined value is a numeral value that is set in advance by the developer of the game or the like. This is true for a step S121.

If "NO" is determined in the step S107, that is, when the count value of the transmission counter is less than the predetermined value, the process returns to the step S103 with no operation. In contrast, if "YES" is determined in the step S107, that is, when the count value of the transmission counter is equal to or more than the predetermined value, a reception counter is reset in a step S109 shown in FIG. 17. That is, a count value of the reception counter is set to "0".

In a succeeding step S111, reception of a beacon signal from one or more other game apparatuses 10 is tried. When the beacon signal from one or more other game apparatuses 10 is received, the CPU 20 stores a received beacon signal to the transmission/reception data buffer 504a. In a next step S113, it is determined whether a beacon signal from one or more other game apparatuses 10 is received. Here, it is determined whether the beacon signal that is sent from one or more other game apparatuses 10 is stored in the transmission/reception data buffer 504a.

If "NO" is determined in the step S113, that is, if no beacon signal from one or more other game apparatuses 10 is received, the process proceeds to a step S119 with no operation. In contrast, if "YES" is determined in the step S113, that is, when the beacon signal from one or more other game apparatuses 10 is received, in a step S115, it is determined whether the game ID is identical. That is, the CPU 20 determines whether the game ID included in the beacon signal that is received is coincident with the game ID of the game that is being performed by the own game apparatus 10.

If "YES" is determined in the step S115, that is, when the game IDs are coincident with each other, the process proceeds to the step S119 with no operation. On the other hand, if "NO" is determined in the step S115, that is, if the game IDs are not coincident with each other, in a step S117, the beacon signal is erased from the transmission/reception data buffer 504a, and then, the process proceeds to the step S119.

In addition, in a case where a plurality of beacon signals are received in the step S111, the processing in the step S115 is performed for each of the received beacon signals, and according to a determination result, the processing in the step S117 is performed.

In the step S119, the reception counter is incremented. That is, "1" is added to a count value of the reception counter. Then, in a step S121, it is determined whether the count value of the reception counter is equal to or more than a predetermined value. If "NO" is determined in the step S121, that is, when the count value of the reception counter is less than the predetermined value, the process returns to the step S111. In contrast, if "YES" is determined in the step S121, that is, when the count value of the reception counter is equal to or more than the predetermined value, the process returns to the step S101 shown in FIG. 16.

Thus, by using the counters, the beacon signal is repeatedly sent or reception of the beacon signal is repeatedly tried. In addition, by using the counters, a case (mode) where the beacon signal is to be sent and a case (mode) where the beacon signal is to be received (tried to be received) are switched. Therefore, in a case where the status notifying beacon signal is to be sent/received, a mode searching a candidate of the battle opponent and a mode to be searched for a candidate of the battle opponent (searched mode) are switched. Since such a beacon signal sending/receiving process is repeatedly performed during a time that the entire game process is performed, the game apparatus 10 repeatedly searches another game apparatus 10 that is a candidate of the battle opponent.

According to this embodiment, since a classification is automatically changed by performing a communication with a passer-by player based on a mutual agreement and thus determining the passer-by player as an acquaintance player, even if the passer-by player is not registered as a friend player, it is possible to know the game situation and the communication situation of the acquaintance player after the change in classification. Therefore, in a case where the player wishes to perform a communication with the same player, it is possible to send an offer of communication by searching the acquaintance player and grasping the current situation thereof. That is, it is possible to diversify a communication while eliminating a troublesome operation.

Furthermore, in this embodiment, in a case where a game is performed, since an acquaintance player with whom the player has performed a communication at least once is registered as a friend player, even if the acquaintance player is a player who is difficult to meet face-to-face, by repeating a communication, a degree of closeness and reliability is made higher, and then, the acquaintance player can be registered as a friend player. Furthermore, it is possible to prevent a player such as a passer-by player who is completely unknown from being registered as a friend player. However, it is possible to modify to such a structure that a passer-by player can be registered as a friend player based on a mutual agreement with the passer-by player without going through registration as an acquaintance player.

Furthermore, although a player with whom a communication is performed once is changed from a passer-by player to an acquaintance player in this embodiment, not limited to this. The number of times of communication may be a predetermined number of times of twice or more. Furthermore, not only the number of times of communication but also a term may be preset. In a case where a communication is performed twice or more in a week, for example, a passer-by player may be changed to an acquaintance player.

In this embodiment, after the battle-play is performed with an acquaintance player, the acquaintance player is registered as a friend player through mutual authentication, but an acquaintance player may be registered as a friend player only through mutual authentication without performing the battle-play.

In the above-described embodiment, a case where a player of an information processing apparatus such as a game apparatus is registered as a friend player is described. A method for registering as a friend player described in the above-described embodiment can be applied to a case where another user is registered as a friend or a person in a relationship equivalent to a friend (hereinafter called as "friend or equivalent") in a website that provides SNS (social networking service)." In such a case, another user who is searched with using a search function, another user who is searched with using a user's own profile information (birth place, place of residence, graduating school, etc.) or another user who is registered as a friend or equivalent by a further user who is registered as a friend or equivalent in the user's own apparatus is determined as a user who is a passer-by player or a person in a relationship equivalent to a passer-by player (hereinafter called as "passer-by or equivalent"). If a communication (transmission/reception of message) is performed with a passer-by or equivalent user, for example, as similar to the above-described embodiment, this passer-by or equivalent user is determined as an acquaintance or a person in a relationship equivalent to an acquaintance (hereinafter called as "acquaintance or equivalent"). Then, it is possible to register the acquaintance or equivalent as a friend or equivalent through mutual authentication with the acquaintance or equivalent user.

Furthermore, as described in the above-described embodiment, in the communication game system of this embodiment, a battle-play can be performed by three or more game apparatuses. In such a case, if an acquaintance player exists in a plural number, after the battle-play is ended, for each of the plurality of the acquaintance players, the friend registering screen is displayed, or a single friend registering screen that each of the plurality of acquaintance players can be respectively selected is displayed. Then, it is selected whether each acquaintance player is to be registered as a friend player.

Furthermore, in this embodiment, a case where a portable game apparatus capable of performing a local communication and an internet communication is used, but it is possible to use a non-portable game apparatus capable of performing an internet communication.

Furthermore, the structure of the game apparatus is not limited to that of the embodiment. For example, a display device (LCD) may be used by dividing a single LCD into two displaying areas. A touch panel may be provided on the first LCD, or on both of the first LCD and the second LCD. A touch panel may not be provided. Furthermore, the game apparatus may comprise a GPS function. In such a case, it is possible to detect one or more other game apparatuses at a short distance (within the predetermined area) based on an actual distance.

In addition, specific numeral values shown in the above-described embodiments are only examples and thus may be properly changed according to actual products.

The systems, devices and apparatuses described herein may include one or more processors, which may be located in one place or distributed in a variety of places communicating via one or more networks. Such processor(s) can, for example, use conventional 3D graphics transformations, virtual camera and other techniques to provide appropriate images for display. By way of example and without limitation, the processors can be any of: a processor that is part of or is a separate component co-located with the stationary display and which communicates remotely (e.g., wirelessly) with the movable display; or a processor that is part of or is a separate component co-located with the movable display and communicates remotely (e.g., wirelessly) with the stationary display or associated equipment; or a distributed processing arrangement some of which is contained within the movable display housing and some of which is co-located with the stationary display, the distributed units communicating together via a connection such as a wireless or wired network; or a processor(s) located remotely (e.g., in the cloud) from both the stationary and movable displays and communicating with each of them via one or more network connections; or any combination or variation of the above.

The processors can be implemented using one or more general-purpose processors, one or more specialized graphics processors, or combinations of these. These may be supplemented by specifically-described ASICs (application specific integrated circuits) and/or logic circuitry. In the case of a distributed processor architecture of arrangement, appropriate data exchange and transmission protocols are used to provide low latency and maintain interactivity, as will be understood by those skilled in the art.

Similarly, program instructions, data and information for implementing the systems and methods described herein may be stored in one or more on-board and/or removable memory devices. Multiple memory devices may be part of the same device or different devices, which are co-located or remotely located with respect to each other.

While certain example systems, methods, storage media, devices and apparatuses have been described herein, it is to be understood that the appended claims are not to be limited to the systems, methods, storage media, devices and apparatuses disclosed, but on the contrary, are intended to cover various modifications and equivalent arrangements included within the spirit and scope of the appended claims.

What is claimed is:

1. An information processing apparatus, comprising:
   communication circuitry operable to perform communication with a plurality of other information processing apparatuses;
   a display; and
   a processing unit including at least one hardware processor, the processing unit being configured to at least:
      execute an application;
      control receiving, from each of the plurality of other information processing apparatuses, player information, an application identifier identifying an application executed by the other information processing apparatus, and status of the application executed by the other information processing apparatus;
      for each of the plurality of other information processing apparatuses:
         determine whether the received application identifier corresponds to the application executed by the processing unit, and based on determining that the received application identifier corresponds to the application executed by the processing unit, register the other information processing apparatus as being one of a first classification, a second classification and a third classification,
         wherein the other information processing apparatus is automatically registered as being of the first classification based on determining, using information received from the other information processing apparatus, that the other information processing apparatus has performed a predetermined operation in the application executed by the other information processing apparatus, the other information processing apparatus is registered as being of the second classification based on mutual authentication performed between the information processing apparatus and the other information processing apparatus, and the other information processing apparatus is registered as being of the third classification based on the other information processing apparatus not being registered with the first classification and not being registered with the second classification; and control the display to display information about the plurality of other information processing apparatuses, wherein the displayed information includes information about at least one other information processing apparatus determined as being of the first classification, information about at least one other information processing apparatus determined as being of the second classification, information about at least one other information processing apparatus determined as being of the third classification, and, based on the received statuses of the applications executed by the other information processing apparatuses, an indication for each of the other information processing apparatuses for which information is displayed as to whether the respective other information processing apparatus is available to perform communication corresponding to the application executed by the processing unit.

2. The information processing apparatus according to claim 1, wherein the at least one other information processing apparatus of the first classification and the at least one other information processing apparatus of the second classification are different from each other in at least a part of available functions when a communication is performed using the communication circuitry.

3. The information processing apparatus according to claim 1, wherein the information about the plurality of other information processing apparatuses is displayed in a manner that the first classification and the second classification can be identified from each other.

4. The information processing apparatus according to claim 1, wherein the information about the plurality of other information processing apparatuses is displayed in a manner that the other information processing apparatuses can be identified at least in terms of being classified to the first classification, the second classification, or the third classification when a communication request from the other information processing apparatus is received by the communication circuitry.

5. The information processing apparatus according to claim 1, wherein the communication circuitry performs a communication based on a mutual agreement between a user of his/her own information processing apparatus and a user of the other information processing apparatus apparatuses.

6. The information processing apparatus according to claim 1, wherein one or more of the plurality of other information processing apparatuses are unspecified one or more other information processing apparatuses that are searched for using the communication circuitry.

7. The information processing apparatus according to claim 6, wherein the communication circuitry searches for the unspecified one or more other information processing apparatuses through a short-distance wireless communication.

8. The information processing apparatus according to claim 6, wherein the communication circuitry searches for the unspecified one or more other information processing apparatuses through an internet communication.

9. The information processing apparatus according to claim 6, wherein the communication circuitry repeatedly searches for the unspecified one or more other information processing apparatus, wherein the processing unit is configured to further update whether it is possible to perform communication with the unspecified one or more other information processing apparatuses in accordance with a search result by the communication circuitry.

10. An information processing system, comprising:
a first information processing apparatus; and
a plurality of other information processing apparatuses, the first information processing apparatus comprising:
communication circuitry operable to perform communication with the plurality of other information processing apparatuses;
an input device;
a display; and
a computer system, including at least one processor, the computer system being configured to at least:
execute an application based on control data received from the input device;
during execution of the application, perform communication with the plurality of information processing apparatuses;
control receiving, from each of the plurality of other information processing apparatuses, player information, an application identifier identifying an application executed by the other information processing apparatus, and status of the application executed by the other information processing apparatus;
for each of the plurality of other information processing apparatuses:
determine whether the received application identifier corresponds to the application executed by the processing unit, and based on determining that the received application identifier corresponds to the application executed by the processing unit, register the other information processing apparatus as being one of a first classification, a second classification and a third classification,
wherein the other information processing apparatus is automatically registered as being of the first classification based on determining, using information received from the other information processing apparatus, that the other information processing apparatus has performed a predetermined operation in the application executed by the other information processing apparatus, the other information processing apparatus is registered as being of the second classification based on mutual authentication performed between the information processing apparatus and the other information processing apparatus, and the other information processing apparatus is registered as being of the third classification based on the other information processing apparatus not being registered with the first classification and not being registered with the second classification;
control displaying, on the display, information about the plurality of other information processing apparatuses, wherein the displayed information includes information about at least one other information processing apparatus determined as being of the first classification, information about at least one other information processing apparatus determined as being of the second classification, information about at least one other information processing apparatus determined as being of the third classification, and, based on the received statuses of the applications executed by the other information processing apparatuses, an indication for each of the other information processing apparatuses for which information is displayed as to whether the respective other information processing apparatus is available to perform communication corresponding to the application executed by the processing unit.

11. A non-transitory storage medium storing an information processing program executable by a computer of an information processing apparatus including communication circuitry operable to perform communication with a plurality of other information processing apparatuses, the information processing program causes the computer to:
execute an application;
control receiving, from each of the plurality of other information processing apparatuses, player information, an application identifier identifying an application executed by the other information processing apparatus, and status of the application executed by the other information processing apparatus;
for each of the plurality of other information processing apparatuses:
determine whether the received application identifier corresponds to the application executed by the processing unit, and based on determining that the received application identifier corresponds to the application executed by the processing unit, register the other information processing apparatus as being one of a first classification, a second classification and a third classification,
wherein the other information processing apparatus is automatically registered as being of the first classification based on determining, using information received from the other information processing apparatus, that the other information processing apparatus has performed a predetermined operation in the application executed by the other information processing apparatus, the other information processing apparatus is registered as being of the second classification based on mutual authentication performed between the information processing apparatus and the other information processing apparatus, and the other information processing apparatus is registered as being of the third classification based on the other information processing apparatus not being registered with the first classification and not being registered with the second classification; and
control displaying information about the plurality of other information processing apparatuses on a display device, wherein the displayed information includes information about at least one other information processing apparatus determined as being of the first classification, information about at least one other information processing apparatus determined as being of the second classification, information about at least one other information processing apparatus determined as being of the third classification, and, based on the received statuses of the applications executed by the other information processing apparatuses, an indication for each of the other information processing apparatuses for which information is displayed as to whether the respective other information processing apparatus is available to perform communication corresponding to the application executed by the processing unit.

12. An information processing method performed by a computer having a communication circuitry operable to perform communication with a plurality of other information processing apparatuses, the computer performing:
executing an application;
receiving, from each of the plurality of other information processing apparatuses, player information, an application identifier identifying an application executed by the other information processing apparatus, and status of the application executed by the other information processing apparatus;
for each of the plurality of other information processing apparatuses:
determining whether the received application identifier corresponds to the application executed by the processing unit, and based on determining that the received application identifier corresponds to the application executed by the processing unit, register the other information processing apparatus as being one of a first classification, a second classification and a third classification,
wherein the other information processing apparatus is automatically registered as being of the first classification based on determining, using information received from the other information processing apparatus, that the other information processing apparatus has performed a predetermined operation in the application executed by the other information processing apparatus, the other information processing apparatus is registered as being of the second classification based on mutual authentication performed between the information processing apparatus and the other information processing apparatus, and the other information processing apparatus is registered as being of the third classification based on the other information processing apparatus not being registered with the first classification and not being registered with the second classification; and
displaying information about the plurality of other information processing apparatuses, wherein the displayed information includes information about at least one other information processing apparatus determined as being of the first classification, information about at least one other information processing apparatus determined as being of the second classification, information about at least one other information processing apparatus determined as being of the third classification, and, based on the received statuses of the applications executed by the other information processing apparatuses, an indication for each of the other information processing apparatuses for which information is displayed as to whether the respective other information processing apparatus is available to perform communication corresponding to the application executed by the processing unit.

13. The information processing apparatus according to claim 1, wherein
the displayed information about the plurality of other information processing apparatuses includes, for each of the other information processing apparatuses, an indication of whether the application is being executed on the respective other information processing apparatus in the single user mode or the multi user mode.

14. An information processing apparatus, comprising:
communication circuitry configured to perform short-distance wireless communication with a plurality of other information processing apparatuses; and
a processing system including at least one processor, the processing system configured to:
execute an application;
control receiving, from each of the plurality of other information processing apparatuses, player information, an application identifier identifying an application executed by the other information processing apparatus, and status of the application executed by the other information processing apparatus;
for each of the plurality of other information processing apparatuses, determine, based on the received status of the application executed by the other information processing apparatus, whether the other information processing apparatus is available to perform communication corresponding to the application executed by the processing system, and control displaying, on a display, information representing the other information processing apparatus with an indication of whether the other information processing apparatus is available to perform communication corresponding to the application executed by the processing system; and
for each of the plurality of other information processing apparatuses, automatically determine a classification, wherein a first classification is assigned to the other information processing apparatus based on determining, using information received from the other information processing apparatus, that the other information processing apparatus has performed a predetermined operation in the application executed by the other information processing apparatus, a second classification is assigned to other information processing apparatus based on mutual authentication performed between the information processing apparatus and the other information processing apparatus, and a third classification is assigned to other information processing apparatus based on the other information processing apparatus not being registered with the first classification and not being registered with the second classification, wherein the displayed information includes information about at least one other information processing apparatus assigned the first classification, information about at least one other information processing apparatus assigned the second classification, information about at least one other information processing apparatus assigned the third classification.

15. The information processing apparatus according to claim 14, wherein the executed application is a game application, and the predetermined operation is a multi-player game in the game application.

16. The information processing apparatus according to claim 14, wherein the executed application is a game application and the predetermined operation is a character exchange for use in the game application between the information processing apparatus and the one or more other information processing apparatuses having the second classification.

17. The information processing apparatus according to claim 15, wherein each of the other information processing apparatuses assigned with the same first, second or third classification is displayed a group corresponding to the first, second or third classification, and the information displayed on the display includes information representing at least two other information processing apparatus assigned with the first classification, information representing at least two other information processing apparatus assigned with the second classification, and information representing at least two other information processing apparatus assigned with the third classification.

18. The information processing apparatus according to claim 1, wherein performing the mutual authentication includes: in response to an input, sending, to the one or more other information processing apparatuses registered with the first classification, a request to change classification to the second classification, and receiving a response from the one or more other information processing apparatuses accepting the request to change to the second classification.

19. The information processing apparatus according to claim 1, wherein each of the plurality of other information processing apparatuses for which information is displayed on the display is within a predetermined range of the communication circuitry for performing short distance wireless communication and is available to perform a multi-player game with the information processing apparatus.

20. The information processing apparatus according to claim 1, wherein one or more of the plurality of other information processing apparatuses are registered with the third classification if communication has not been performed previously between the information processing apparatus and the other information processing apparatus, and if the other information processing apparatuses is executing the application in a mode enabling short-distance wireless communication with the information processing apparatuses.

* * * * *